US008891480B2

(12) United States Patent
Bachu et al.

(10) Patent No.: US 8,891,480 B2
(45) Date of Patent: Nov. 18, 2014

(54) POSITIONING REFERENCE SIGNALS IN A TELECOMMUNICATION SYSTEM

(75) Inventors: Raja Sekhar Bachu, Somerset, NJ (US); Ashwin Sampath, Skillman, NJ (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 12/826,522

(22) Filed: Jun. 29, 2010

(65) Prior Publication Data
US 2011/0158200 A1    Jun. 30, 2011

Related U.S. Application Data

(60) Provisional application No. 61/222,423, filed on Jul. 1, 2009.

(51) Int. Cl.
*H04H 20/71* (2008.01)
*H04J 4/00* (2006.01)
(Continued)

(52) U.S. Cl.
CPC ............. *H04L 5/0007* (2013.01); *H04W 72/04* (2013.01); *H04L 5/0053* (2013.01); *H04W*
(Continued)

(58) Field of Classification Search
CPC .......... H04W 72/005; H04W 72/0446; H04W 72/0453; H04W 4/06; H04W 8/26; H04W 88/08; H04W 24/00; H04L 12/18; H04L 12/184; H04L 12/185; H04L 12/189; H04L 12/2614; H04L 5/003; H04L 5/023; H04L 5/06; H04L 27/261; H04J 4/00; H03C 3/00; H03C 3/06; H03C 3/0941; H03C 3/0958; H03C 3/0966; H03C 3/0983; H04B 7/061; H04B 7/0691; H04B 1/38; G01S 1/08; G01S 1/042; H04Q 7/34; C07C 15/085; C07C 409/10
USPC ......... 370/208, 252, 328, 329, 330, 336, 343, 370/344, 431, 432, 436, 464, 205, 213, 312, 370/478; 455/60, 62, 424, 428, 550.1, 455/450–453, 23, 44, 112; 375/295, 343, 375/239
See application file for complete search history.

(56) References Cited

U.S. PATENT DOCUMENTS

| 7,893,873 B2 | 2/2011 | Black et al. |
| 2009/0042615 A1 | 2/2009 | Teo et al. |

(Continued)

FOREIGN PATENT DOCUMENTS

| JP | 2009060595 A | 3/2009 |
| JP | 2012523736 A | 10/2012 |

(Continued)

OTHER PUBLICATIONS

"3GPP TS 36.211 V8.6.0 Evolved Universal Terrestrial Radio Access (E-UTRA);Physical Channels and Modulation (Release 8)"3rd Generation Partnership Project (3GPP); Technicalspecification (TS), XX, XX, [Online] No. TS 36.211 V8.6.0, Mar. 1, 2009 , pp. 1-83, XP002564072Retrieved from the Internet:URL:http://www.3gpp.org/ftp/Specs/html-info/36211.htm [retrieved on Jan. 19, 2010.

(Continued)

*Primary Examiner* — Marsha D Banks Harold
*Assistant Examiner* — Dharmesh Patel

(57) ABSTRACT

Systems and methods are described to supply positioning reference signal (PRS) in a telecommunication system. A base station supplies a PRS sequence according at least to a time-frequency pattern of modulation symbols, wherein the time-frequency pattern assigns a modulation symbol to each frequency tone in a block of time-frequency resources allocated to transmit PRS. The base station associates a modulation symbol in the time-frequency pattern with a reference symbol in the PRS sequence through a mapping that represents the time-frequency pattern. The PRS sequence is conveyed to user equipment through delivery of a set of modulation symbols established through the mapping. Different time-frequency patterns can be exploited based on time-structure of a radio sub-frame. The user equipment receives the PRS sequence according to at least the time-frequency pattern of modulation symbols and utilizes at least the PRS sequence as part of a process to produce a location estimate.

28 Claims, 14 Drawing Sheets

(51) Int. Cl.
*H04B 7/165* (2006.01)
*H04B 1/00* (2006.01)
*H04B 1/04* (2006.01)
*H04L 5/00* (2006.01)
*H04W 64/00* (2009.01)
*H04W 72/04* (2009.01)

(52) U.S. Cl.
CPC .............................................. 64/00 (2013.01)
USPC ........... 370/330; 370/312; 370/478; 375/239; 455/23; 455/44; 455/112

(56) References Cited

U.S. PATENT DOCUMENTS

| | | | |
|---|---|---|---|
| 2009/0257342 A1* | 10/2009 | Lin et al. ........................ | 370/208 |
| 2010/0195566 A1* | 8/2010 | Krishnamurthy et al. .... | 370/328 |
| 2012/0044796 A1 | 2/2012 | Yoon et al. | |

FOREIGN PATENT DOCUMENTS

| | | | | |
|---|---|---|---|---|
| TW | M352854 U | 3/2009 | | |
| TW | M359875 U | 6/2009 | | |
| WO | WO-2007120326 A2 | 10/2007 | | |
| WO | WO-2010117116 A1 | 10/2010 | | |
| WO | WO2010124448 | * | 11/2010 | .............. H04L 27/16 |
| WO | WO 2010124448 A1 | * | 11/2010 | |

OTHER PUBLICATIONS

Huawei: "Cell-specific integer sequences for frequency positioning of DL RS on subframe basis" 3G-PP Draft;. RI-070532, 3rd Generation Partnership Project (3GPP), Mobile Competence Centre ; 650, Route.Des Lucioles ; F-06921 Sophia-Antipolis Cedex ; France, vol. RAN WG1, No. Sorrento, Italy; 20070115, Jan. 12, 2007, XP050104558 p. 1, line 1—p. 2, line 22 p. 4, line 1—p. 5, line 12.
International Search Report and Written Opinion—PCT/US2010/040833, International Search Authority—European Patent Office—Oct. 14, 2010.
Pantech & Curitel: "PRS design for LTE Rel-9 positioning" 3GPP Draft; R1-092590_PRS Design for LTE REL-9 Positioning, 3rd Generation Partnership Project (3GPP), Mobile Competence Centre ; 650, Route Des Lucioles ; F-06921 Sophia-Antipolis Cedex ; France, No. Los Angeles, USA; 20090626, Jun. 26, 2009, XP050351086 [retrieved on Jun. 26, 2009].
Qualcomm Europe: "Positioning Performance and Design of PA-RS" 3GPP Draft; R1-092207 Positioning Update, 3rd Generation Partnership Project (3GPP), Mobile Competence Centre ; 650, Route Des Lucioles ; F-06921 Sophia-Antipolis Cedex ; France, No. San Francisco, USA; 20090505, May 5, 2009, XP050339632 [retrieved on May 5, 2009].
Universal Mobile Telecommunications System (UMTS); User Equipment (UE) positioning in Universal Terrestrial Radio Access Network (UTRAN); Stage 2 (SGPP TS 25.305 version 8.1.0 Release 8); ETSI TS 125 305 ETSI Standard, European Telecommunications Standards Institute (ETSI), Sophia Antipolis Cedex, France, vol. 3-R2, No. V8.1.0, Jan. 1, 2009, XP014043153 paragraph [0009]-paragraph [09.1].
ZTE: "Positioning PRS design in LTE R9" 3GPP Draft; R1-091704 Positioning PRS Design in LTE R9, 3rd Generation Partnership Project (3GPP), Mobile Competence Centre ; 650, Route Des Lucioles ; F-06921 Sophia-Antipolis Cedex ; France, No. San Francisco, USA; 20090428, Apr. 28, 2009, XP050339240 [retrieved on Apr. 28, 2009].
Lucent A., et al., "Further Results on DL OTDOA Performance with Dedicated LCS-RS, R1-091473", 3GPP TSG RAN WG1 #56bis, pp. 1-3.
Taiwan Search Report—TW099121727—TIPO—Jan. 17, 2013.

* cited by examiner

POSITIONING REFERENCE SIGNALS IN A TELECOMMUNICATION SYSTEM

CROSS-REFERENCE TO RELATED APPLICATION

This application claims the benefit of U.S. Provisional Patent Application Ser. No. 61/222,423 entitled "POSITIONING REFERENCE SIGNAL (PRS) PATTERNS" which was filed Jul. 1, 2009. The entirety of the aforementioned provisional patent application is herein incorporated by reference.

BACKGROUND

I. Field

The following description relates generally to wireless communications and, more particularly, to time-frequency domain structure of positioning reference signal (PRS) and utilization thereof in a telecommunication system.

II. Relevant Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on wireless links, e.g., uplink or downlink, in the air-interface. The downlink (DL) refers to the telecommunication link from base stations to UEs, and the uplink (UL) refers to the telecommunication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

Various types of base stations can communicate with a UE. Each of the various types of base stations can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femtocell base station is another class of base station that has recently emerged. Femtocell base stations are commonly designed for residential or small business environments, and can provide wireless coverage to UEs using a wireless technology (e.g., 3GPP Universal Mobile Telecommunications System (UMTS) or LTE, 1x Evolution-Data Optimized (1xEV-DO), . . . ) to communicate with the UEs and an existing broadband Internet connection (e.g., digital subscriber line (DSL), cable, . . . ) for backhaul. A femtocell base station can also be referred to as a Home Evolved Node B (HeNB), a Home Node B (HNB), a femtocell, an access point base station, or the like. Examples of other types of base stations include pico cell base stations, micro cell base stations, and so forth.

In addition to operation in wireless telecommunication systems in which wireless service is afforded through disparate base stations, a UE can consume data related to various services such as location-based services. Based on technology or provisioning settings (e.g., enabled functionality) of the UE, position of the UE can be estimated at least in part by the UE through data received from a plurality of satellites, or from control signaling received from a plurality of base stations. In 3GPP LTE networks, such control signaling data includes positioning reference signal (PRS), which is transmitted by the plurality of base stations and received by the UE. In conventional telecommunication systems, decoding of PRS sequences of reference symbols at the receiver generally results in secondary correlation peaks. Such secondary correlation peaks are effectively spurious since they can affect determination of time-of-flight intervals that are part of process(es) (e.g., trilateration, triangulation . . . ) to produce an estimate of location of the UE.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Various aspects are described in connection with time-frequency domain structure of positioning reference signal (PRS) and utilization thereof in a telecommunication system. A base station supplies a PRS sequence according to a time-frequency pattern of modulation symbols, wherein the time-frequency pattern assigns a modulation symbol to each frequency tone in a block of time-frequency resources allocated to transmit PRS. The base station associates a modulation symbol in the time-frequency pattern with a reference symbol in the PRS sequence according to a mapping that represents the time-frequency pattern. The PRS sequence is conveyed to a user equipment through delivery of the set of modulation symbols established through the mapping. The time-frequency pattern is specific to the base station. In addition, different time-frequency patterns can be exploited based on time-structure of a radio sub-frame employed for telecommunication. The user equipment receives from the base station the PRS sequence according to at least the time-frequency pattern of modulation symbols and utilizes at least the PRS sequence as part of a process to produce a location estimate.

In an aspect, disclosed is a method, comprising: selecting a pattern in time-frequency domain, wherein the pattern in time-frequency domain assigns a modulation symbol to each frequency tone in a block of time-frequency resources; mapping a positioning reference signal (PRS) sequence to a set of modulation symbols in time-frequency domain according to at least the pattern; and conveying the PRS sequence through delivery of the set of modulation symbols.

Additional methods are disclosed, in another aspect, the additional methods include a method comprising: receiving from a base station a positioning reference signal (PRS) sequence according to at least a time-frequency pattern of modulation symbols, wherein the time-frequency pattern assigns a modulation symbol to each frequency tone in a block of time-frequency resources; and utilizing at least the PRS sequence as part of a process to produce a location estimate.

In yet another aspect, an apparatus is disclosed, the apparatus comprising: at least a memory that retains instructions related to selecting a pattern in time-frequency domain, wherein the pattern in time-frequency domain assigns a modulation symbol to each frequency tone in a block of time-frequency resources, mapping a positioning reference signal (PRS) sequence to a set of modulation symbols in time-frequency domain according to at least the pattern, and conveying the PRS sequence through delivery of the set of modulation symbols; and at least a processor functionally coupled to at least the memory and configured to execute the instructions retained in at least the memory.

The subject disclosure describes additional apparatuses. In a further aspect, the additional apparatuses include an apparatus, comprising: at least a memory that retains instructions related to receiving from a base station a positioning reference signal (PRS) sequence according to at least a time-frequency pattern of modulation symbols, wherein the time-frequency pattern assigns a modulation symbol to each frequency tone in a block of time-frequency resources, and utilizing at least the PRS sequence as part of a process to produce a location estimate; and at least a processor functionally coupled to at least the memory and configured to execute the instructions retained in at least the memory.

In an additional aspect, disclosed is a wireless communication apparatus, comprising: means for selecting a pattern in time-frequency domain, wherein the pattern in time-frequency domain assigns a modulation symbol to each frequency tone in a block of time-frequency resources; means for mapping a positioning reference signal (PRS) sequence to a set of modulation symbols in time-frequency domain according to at least the pattern; and means for conveying the PRS sequence through delivery of the set of modulation symbols.

A further aspect describes an additional wireless communication apparatus, comprising: means for receiving from a base station a positioning reference signal (PRS) sequence according to at least a time-frequency pattern of modulation symbols, wherein the time-frequency pattern assigns a modulation symbol to each frequency tone in a block of time-frequency resources; and means for employing at least the PRS sequence as part of a process to produce a location estimate.

Additional aspects describe a computer program product. The computer program product comprising: a computer-readable medium, comprising: code for causing at least one computer to select a pattern in time-frequency domain, wherein the pattern in time-frequency domain assigns a modulation symbol to each frequency tone in a block of time-frequency resources; code for causing the at least one computer to map a positioning reference signal (PRS) sequence to a set of modulation symbols in time-frequency domain according to at least the pattern; and code for causing the at least one computer to convey the PRS sequence through delivery of the set of modulation symbols.

Further aspects describe an additional computer program product, computer program product, comprising: a computer-readable medium, comprising: code for causing at least one computer to receive from a base station a positioning reference signal (PRS) sequence according to at least a time-frequency pattern of modulation symbols, wherein the time-frequency pattern assigns a modulation symbol to each frequency tone in a block of time-frequency resources; and code for causing the at least one computer to utilize at least the PRS sequence as part of a process to produce a location estimate.

Still further aspects of the subject disclosure are directed to a wireless communication apparatus, comprising: at least a processor configured to: select a pattern in time-frequency domain, wherein the pattern in time-frequency domain assigns a modulation symbol to each frequency tone in a block of time-frequency resources; map a positioning reference signal (PRS) sequence to a set of modulation symbols in time-frequency domain according to at least the pattern; and transmit the PRS sequence through delivery of the set of modulation symbols.

The disclosure provides alternative wireless communication apparatuses. In an aspect, such wireless communication apparatuses include a wireless communication apparatus comprising: at least a processor configured to: receive from a base station a positioning reference signal (PRS) sequence according to at least a time-frequency pattern of modulation symbols, wherein the time-frequency pattern of modulation symbols assigns a modulation symbol to each frequency sub-carrier in a block of time-frequency resources; and utilize at least the PRS sequence as part of a trilateration process to produce a location estimate.

At least an advantage of the aspects described herein is that secondary correlation peak(s) in detection of PRS sequence(s) is mitigated due in part to the time-frequency structure of the pattern(s) that assigns a set of modulation symbols to reference symbols in the PRS sequence(s). In addition, while illustrated for cellular wireless systems, the aspects of the subject disclosure are not so limited and can be exploited in most any wireless communication system, such as a private or semi-private non-planned wireless networks (e.g., Wi-Fi networks, femtocell networks). In addition, for a wireless communication system, the various aspects described herein can be exploited irrespective of particular radio technologies employed for telecommunication.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
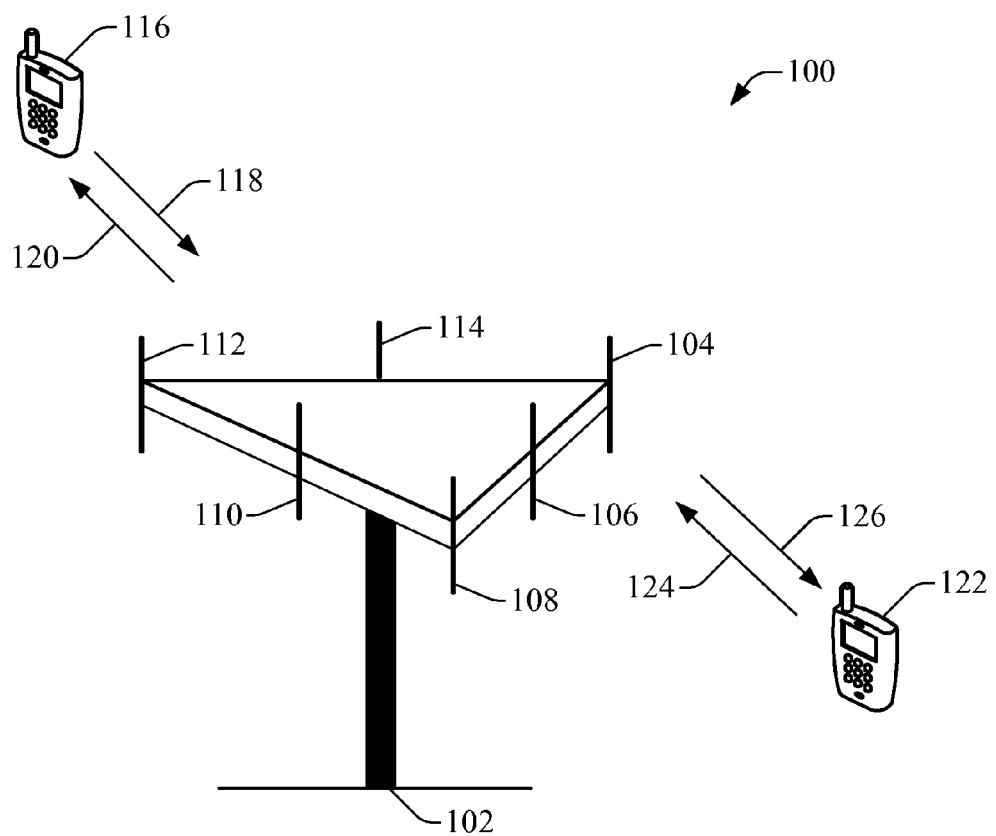
FIG. 1 illustrates a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer-readable storage media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as code division multiple access (CDMA) systems, time division multiple access (TDMA) systems, frequency division multiple access (FDMA) systems, orthogonal frequency division multiple access (OFDMA) systems, single carrier-frequency division multiple access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA (E-UTRA).

Furthermore, various aspects are described herein in connection with user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile device, remote station, remote terminal, user terminal, terminal, wireless communication device, user agent, user device, or access terminal. A UE can be a cellular telephone, a cordless telephone, a Session Initiation Protocol (SIP) phone, a wireless local loop (WLL) station, a PDA, a handheld device having wireless connection capability, computing device, or other processing device connected to a wireless modem. Moreover, various aspects are described herein in connection with a base station. A base station can be utilized for communicating with UE(s) and also can be referred to as an access point, Node B, Evolved Node B (eNodeB, eNB) or some other terminology. A base station can refer to a device in an access network that communicates over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as employed in this application and the appended claims should generally be construed to mean "one or more" unless specified otherwise or clear from the context to be directed to a singular form.

Furthermore, in the subject disclosure, the term "set" is intended to refer to groups of one or more entities; for example, a set of data packets refers to one or more data packets. However, as employed herein, the term "subset" can include the empty set unless otherwise noted, as in cases in which, for instance, disclosure of a subset of one or more entities is intended to expressly avoid the empty subset.

Moreover, various functions described herein can be implemented in hardware, software, firmware, or any combination thereof. If implemented in software, the functions can be stored on or transmitted over as one or more instructions or code on a computer-readable medium. Computer-readable media includes both computer-readable storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules, etc. discussed in connection with the figures need not be included. A combination of these approaches can also be used.

Referring now to FIG. 1, an example telecommunication system 100 is illustrated in accordance with various aspects presented herein. The subject example telecommunication system 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. Communication amongst base station 102 and the one or more UEs can include delivery of positioning reference signal(s) from the base station 102 to the one or more UEs, wherein the delivery is accomplished through PRS sequence(s) of modulation symbols in accordance with various aspects described hereinafter. Even though a single base station 102 is illustrated in example telecommunication system 100, UE 116 or UE 122 can receive positioning reference signal(s) from a plurality of base stations; such reception enables the UE 116 or the UE 122 to utilize the positioning reference signal(s) as part of a trilateration process, for example, to produce a location estimate. In one or more embodiments, UE 116 and UE 122 can be, for example, cellular phones, smart phones, laptops, handheld communication devices, handheld computing devices, satellite radios, global positioning systems, PDAs, and/or any other suitable device for communicating over example telecommunication system 100. As depicted, UE 116 is in communication with antennas 112 and 114, where antennas 112 and 114 transmit information to UE 116 over a downlink 120 and receive information from UE 116 over an uplink 118. Moreover, UE 122 is in communication with antennas 104 and 106, where antennas 104 and 106 transmit information to UE 122 over a downlink 126 and receive information from UE 122 over an uplink 124. In a frequency division duplex (FDD) system, uplink 118 can utilize a different frequency band than that utilized by downlink 120, and uplink 124 can employ a different frequency band than that employed by downlink 126, for example. Further, in a time division duplex (TDD) system, uplink 118 and downlink 120 can utilize a common frequency band and uplink 124 and downlink 126 can utilize a common frequency band.

Each group of antennas or the area in which they are designated to communicate can be referred to as a sector of base station 102. For example, antenna groups can be designed to communicate to UEs in a sector of the areas covered by base station 102. In communication over uplink 118 and uplink 124, the transmitting antennas of base station 102 can utilize beamforming to improve signal-to-noise ratio of uplink 118 and uplink 124 for UE 116 and UE 122. Also, while base station 102 can utilize beamforming to transmit to UE 116 and UE 122 scattered randomly through an associated coverage area, UEs in neighboring cells can be subject to less interference as compared to a base station transmitting through a single antenna to all its UEs.

Figure 2:
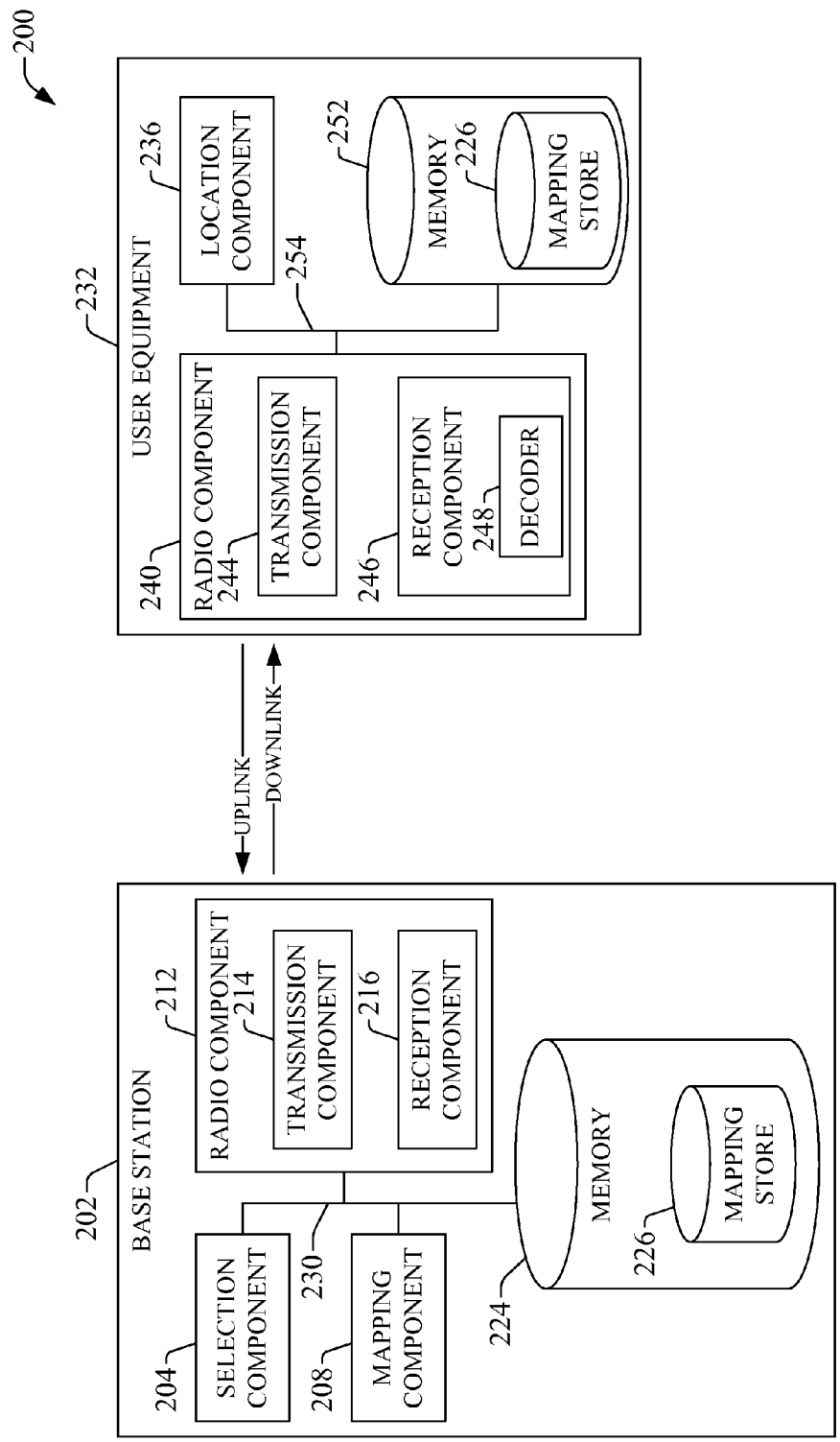
FIG. 2 illustrates an example system that enables and exploits generation of PRS, and delivery and utilization thereof in a wireless communication system in accordance with aspects of the subject disclosure.

FIG. 2 presents an example system 200 that enables and exploits communication of positioning reference signal (PRS) in a wireless communication system in accordance with aspects of the subject disclosure. Example system 200 includes a base station 202 that supplies one or more PRS sequences of reference symbols in accordance with a pattern in time-frequency domain. The pattern is defined in a portion of the time-frequency domain; the portion is configurable and spans a predetermined (e.g., standardized) block of time-frequency resources (e.g., resource elements, physical resource blocks (PRBs), or the like). The pattern is specific to base station 202, or the coverage cell served by the base station 202. However, a set of unique patterns can be re-used throughout a coverage area and the group of base stations that collectively serve the coverage area.

In an aspect, the mapping assigns at least one complex-valued modulation symbol in each frequency tone (or subcarrier) within the predetermined block of time-frequency resources to a reference symbol in the PRS sequence. In a 3GPP LTE network or a 3GPP UMTS network, such aspect can be characterized in terms of the pattern as follows: For a frequency subcarrier within the predetermined block of time-frequency resources, the pattern in time-frequency domain occupies at least one resource element with a reference symbol in a PRS sequence. In another aspect, since the block of time-frequency resources also can be employed to transport other reference signals (e.g., cell specific reference signal (CRS) in 3GPP LTE), the mapping assigns resource elements that are not allocated (based on standardized radio protocol, for example) to carry a reference symbol for a sequence associated with at least one of the other reference signals that can be transmitted within the block of time-frequency resources.

A mapping represents the pattern and assigns a reference symbol in a PRS sequence to a complex-valued modulation symbol within the block of time-frequency resources. Formally, the PRS sequence $\{r_{l,n_s}(m)\}$ is mapped to complex-valued modulation symbols $\{a_{k,l}^{(p)}\}$ for antenna port p in slot $n_s$ according to $a_{k,l}^{(p)}=r_{l,n_s}(m')$, with m'=g(m) and k=f(m,l) where l is a time-domain index and l=0, 1, ... $N_{symb}^{DL}$ where the parameter $N_{symb}^{DL}$ defines the number of symbols in DL for slot $n_s$; k is a frequency-domain index; g(m) is a function that adjusts the value of index m (a positive integer) and f(m,l) is a function that defines at least in part the mapping that represents the pattern in time-frequency domain. In certain embodiments, g(m) is the identity. In 3GPP LTE Rel. 9, p=6; however, a disparate antenna port can be employed in disparate systems. In an aspect, the mapping(s) described herein can include at least a relationship that establishes a frequency-domain index, wherein the relationship includes addition of a static offset and a time-dependent offset, the time-dependent offset can be based on a sequence of numbers defined by a time-domain index and parity of a time slot, and a constant determined in part by an index of the coverage cell in the cellular telecommunication system.

An example mapping can be defined as follows:

$k=6m+(v+v_{shift}) \bmod 6$ $m'=m+N_{RB}^{max,DL}-N_{RB}^{PRS}$ $m=0,1,\ldots,2N_{RB}^{DL}-1$ where $N_{RB}^{PRS}$ is the bandwidth of the positioning reference signal, $N_{RB}^{max,DL}$ is the maximum number of resource blocks in DL that can be utilized by base station 202 for telecommunication, and variables v and $v_{shift}$ define the position in frequency domain of reference symbols that are part of a PRS sequence. The value of v depends on the time-domain index l. The quantity $v_{shift}$ is a cell-specific frequency shift. In certain embodiments, $v_{shift}$ can be defined by $$v_{shift} = \left(N_{ID}^{cell} + \sum_{i=0}^{2} 2^i c(i+3SFN)\right) \bmod 6,$$

where $N_{ID}^{cell}$ is an integer index that identifies (subscript ID stands for identification) base station 202, or a cell served by base station 202, SFN is the system frame number and c(•) is a pseudo-random sequence that can be initialized every SFN period (e.g., 1024 radio sub-frames) with $c_{init}=N_{Cell}^{ID}$. The quantity $v_{shift}$ is defined modulo 6 (mod 6) and can be evaluated through the following equation: (r) mod s=r−sInt(r/s), where r and s are real numbers and Int(•) is the function that maps the argument into its greatest integer. In alternative embodiments, the quantity $v_{shift}$ can be defined by $v_{shift}=(N_{ID}^{cell})\bmod 6$. In the example mapping supra, the frequency-domain index k is periodically repeated every six frequency tones. In addition, in view of the definition of $v_{shift}$, six unique time-frequency patterns are defined and thus a cell re-use of ⅙ can be established. Moreover, in the foregoing example mapping, the frequency-domain index k assigns complex-valued modulation symbols to frequency tones that are spaced by six tones (see, e.g., FIG. 3). Since in telecommunication systems such splitting in frequency domain is commensurate with splitting amongst reference symbols of disparate reference signals (e.g., cell specific reference signal), the foregoing example mapping is advantageous because it simplifies detector complexity at a mobile device (e.g., UE 232) that receives a PRS sequence of reference symbols mapped according to the foregoing example mapping. It should be appreciated that in additional or alternative mapping embodiments, f (m,l) can be defined mod q with q a natural number different from 6 (for example, q=8).

For a cellular wireless communication system, such as a 3GPP LTE wireless network, or a 3GPP UMTS wireless network, the pattern in time-frequency domain can be specific to the time-domain structure of a radio sub-frame that can transport positioning reference signal (PRS). A first time-frequency pattern can be established to a normal radio sub-frame with a normal cyclic prefix (CP) interval as defined in 3GPP LTE network standard, whereas a second time-frequency pattern is established for a radio sub-frame structure with an extended CP as defined in 3GPP LTE network standard. As an example, the first time-frequency pattern can be based on the foregoing example mapping and defined as follows:

$$v = \begin{cases} 4,5,0 & \text{for } l=3,5,6 \quad \text{if } n_S \bmod 2 = 0 \\ 1,2,3,4,5 & \text{for } l=1,2,3,5,6 \quad \text{if } n_S \bmod 2 = 1 \end{cases},$$

whereas the second time-frequency pattern can be defined through $$v = \begin{cases} 0,1 & \text{for } l=4,5 \quad \text{if } n_S \bmod 2 = 0 \\ 2,3,4,5 & \text{for } l=1,2,4,5 \quad \text{if } n_S \bmod 2 = 1 \end{cases}.$$

In addition, a third time-frequency pattern can be established for a multicast/broadcast single frequency network (MBSFN) sub-frame. For example, the third time-frequency pattern can be defined as follows:

$$v = \begin{cases} 5,5,0,1 & \text{for } l=2,3,4,5 \quad \text{if } n_S \bmod 2 = 0 \\ 1,2,3,3,4,5 & \text{for } l=0,1,2,3,4,5 \quad \text{if } n_S \bmod 2 = 1 \end{cases}.$$

Figure 3:
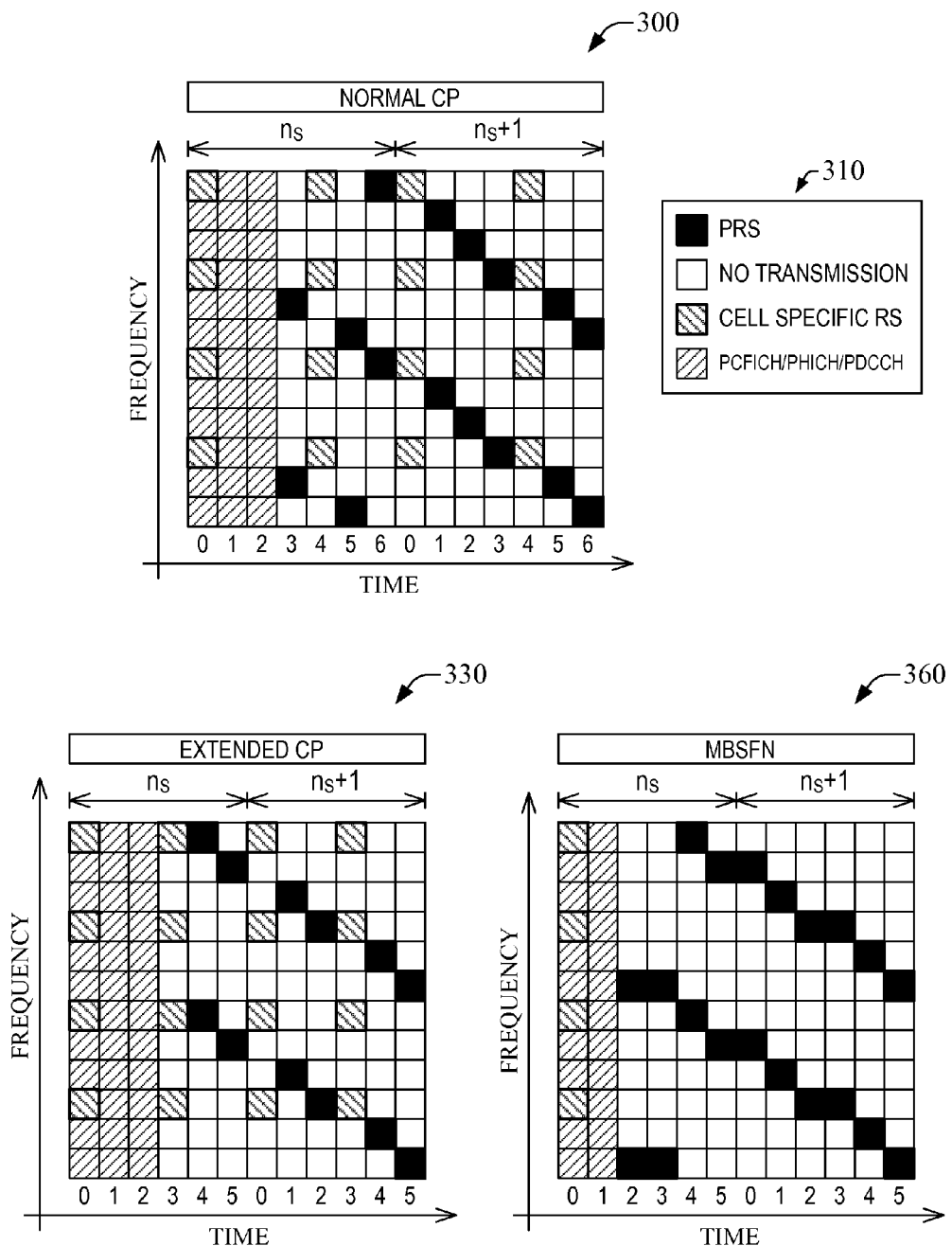
FIG. 3 presents diagrams of PRS sequence patterns in time-frequency domain for various radio sub-frame structures in a wireless communication system in accordance with aspects described herein.

In FIG. 3, diagram 300 illustrates the first time-frequency pattern for slots $n_s$ and $n_s+1$, diagram 330 represents the second time-frequency pattern for such slots; and diagram 360 represents the third time-frequency pattern for such slots.

The first, second, and third time-frequency patterns are illustrated in a block of time-frequency resources that comprise 12 frequency sub-carriers (or frequency tones) and a set of modulation symbols in accordance with time-structure of the respective sub-frame. Indices along the time line indicate values of time-domain index/within a time slot. Graphic keys 310 indicate the reference signals that are represented in FIG. 3: PRS, cell specific reference signal (RS), Physical Control Format Indicator Channel (PCFICH), Physical Downlink Control Channel (PDCCH), and Physical Hybrid-ARQ Indicator Channel (PHICH), wherein ARQ indicates Automatic Repeat Request.

In example system 200, to supply the PRS sequence of reference symbols, base station 202 includes a selection component 204 that can establish (configure, acquire, generate, etc.) a pattern in time-frequency domain for delivery of a positioning reference signal (PRS) sequence. Selection component 204 can indicate, or signal, a selection of a pattern to mapping component 208. The indication also can convey a mapping that represents the pattern; to convey the mapping, selection component 204 can extract the mapping from mapping store 226 or, in the alternative, selection component 204 can point to a memory location within mapping store 226. Mapping component 208 can receive such indication (e.g., detect the indication and decode the payload data therein) and, in response, mapping component 208 can associate the PRS sequence of reference symbols to a set of complex-valued modulation symbols (e.g., OFDM symbols in a 3GPP LTE network or 3GPP UMTS network) according to the mapping.

Base station 202 can convey the PRS sequence to user equipment 232 through a radio component 212. In certain embodiments, the base station 202 can broadcast the PRS sequence of reference symbols. In additional or alternative embodiments, the base station 202 can multicast or unicast the PRS sequence of reference symbols. A configuration component (not shown) in base station 202 can configure the mode (e.g., broadcast, multicast, or unicast) of conveying the PRS sequence of reference symbols.

In the illustrated embodiment, radio component 212 can include a set of antennas (not shown) and various components and related circuitry (filters, amplifiers, processors(s), modulator(s), demodulator(s), etc.) that enable wireless communication, e.g., wireless transmission and wireless reception of data and signaling. As illustrated, radio component 212 can include a transmission component 214 that can deliver the PRS sequence of reference symbols. In an aspect, a coder component (not shown) can be part of transmission component 214 and can code the PRS sequence of reference symbols in accordance with the mapping implemented by mapping component 208 and described herein. Radio component 212 also can include a reception component 216 that can receive data or signaling from UE 232 or other wireless device(s), mobile or otherwise.

Figure 4:
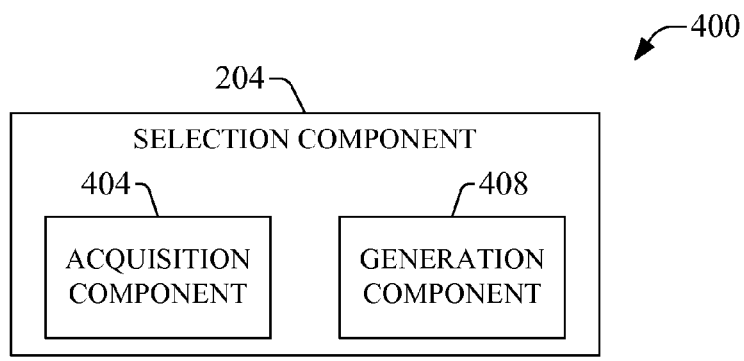
FIG. 4 illustrates an example embodiment of a component that establishes a time-frequency pattern to supply, in part, a PRS sequence of reference symbols in a telecommunication system in accordance with aspects disclosed herein.

In an aspect, selection component 204 can establish the first time-frequency pattern, the second time-frequency pattern, and the third time-frequency pattern; in an embodiment of selection component 204, e.g., example embodiment 400 illustrated in FIG. 4, a generation component 408 can produce the first time-frequency pattern, the second time-frequency pattern, and the third time-frequency pattern. In the alternative, an acquisition component 404 can extract one or more of the first time-frequency pattern, the second time-frequency pattern, or the third time-frequency pattern. Selection component 204 can establish (acquire, generate, etc.) a pattern in time-frequency domain statically or dynamically. In static establishment, a predetermined group of time-frequency patterns, and related mappings, can be dictated by a standard protocol for radio telecommunication and selection component 204 can acquire a pattern and related mapping based on such standard. It should be appreciated that what is static is the predetermined group of time-frequency patterns and each occurrence of a time-frequency pattern in the predetermined group can be time-dependent; see example mapping supra, in which value of $v_{shift}$ can change every time interval corresponding to SFN. In dynamic establishment of a time-frequency pattern, operation complexity or operation conditions (inter-cell interference, radio channel quality, type of data traffic, network congestion, etc.) of the wireless communication system can dictate, at least in part, a time-frequency pattern or group of time-frequency patterns to be employed to supply PRS. In an aspect, one or more selection criteria can be employed to assess whether operation condition warrants generation of a time-frequency pattern. For instance, operation condition can be characterized by a radio quality metric, e.g., a metric related to inter-cell interference, and in scenarios in which the radio quality metric is below a reference value, which can embody a selection criterion, selection component 204 can generate a time-frequency pattern in response to the operation condition. The generated time-frequency pattern can be retained as a mapping in mapping store 226.

In one or more embodiments of example telecommunication system 100, base station 102 can be part of a planned wireless network environment, such as a cellular wireless system, e.g., a 3GPP LTE wireless network or a 3GPP UMTS wireless network. In such one or more embodiments, the base station can be part of a serving set of base stations for a UE that consumes (e.g., receives and utilizes) one or more PRS sequences to produce a location estimate of the UE. In alternative or additional embodiment(s), base station 202 can be a low-power access point (AP) that is part of a private or semi-private non-planned wireless network environment, such as a Wi-Fi network or a femtocell network. Additionally, in base station 202, data and signaling, indications or directives, code instructions and the like can be exchanged amongst selection component 204, mapping component 208, radio component 212, and memory 224 through bus 230, which can be embodied in a memory bus, an address bus, a message bus, or the like.

In example system 200, user equipment 232 can receive PRS from base station 202 through radio component 240. The PRS is received as a sequence of reference symbols mapped to a block of time-frequency resources in accordance with a time-frequency pattern as described supra. In an aspect, the PRS can be received in accordance with a group of disparate time-frequency patterns of modulation symbols for a group of respective disparate radio sub-frames. The group of disparate time-frequency patterns forms a sequence of patterns and the cardinality, or size, of such group determines a periodicity at which positioning reference signals are received. Radio component 340 can convey the sequence of reference symbols to location component 236, which can generate a location estimate of the UE 232 based at least in part on the sequence of reference symbols.

Similarly to radio component 212, radio component 240 can include a set of antennas (not shown) and various components and related circuitry (filters, amplifiers, processors(s), modulator(s), demodulator(s), etc.) that enable wireless communication, e.g., wireless transmission and wireless reception of data and control. As illustrated in example system 200, radio component 240 includes a transmission component 244 that can deliver data or signaling to base station 202 or other base stations. In addition, radio component 240 includes a reception component 246 that receives PRS from the base station 202. In an aspect, reception component 246 includes a decoder component 248, also referred to as decoder 248 in the subject specification and annexed drawings, that decodes a sequence of reference symbols that transport the PRS. In an aspect, reception component 246 receives a PRS sequence in accordance at least with a time-frequency pattern of modulation symbols that is specific to the time-domain structure of the radio sub-frame that carries the PRS sequence. In an aspect, the decoder 248 can decode a first pattern of modulation symbols for the PRS sequence for a normal radio sub-frame with a normal cyclic prefix (CP) interval. In another aspect, the decoder 248 can decode a second pattern of modulation symbols for a normal radio sub-frame with an extended CP interval. In yet another aspect, the decoder 248 can decode a third pattern of modulation symbols for a multicast/broadcast over a single frequency network (MBSFN) sub-frame. In one or more embodiments, the first time-frequency pattern can be the pattern illustrated in diagram 300; the second time-frequency pattern can be the pattern illustrated in diagram 330; and the third time-frequency pattern can be the pattern presented in diagram 360.

In user equipment 232, data and signaling, indications or directives, computer-executable code instructions and the like are exchanged amongst location component 236, radio component 240 and component(s) therein, and memory 252 through bus 254, which can be embodied in a memory bus, an address bus, a message bus, or the like. Memory 252 can include computer-executable code instructions related to various aspects described herein, and a replica of mapping store 226, wherein such replica can be employed for decoding of PRS received in accordance with aspects described herein.

Figure 5:
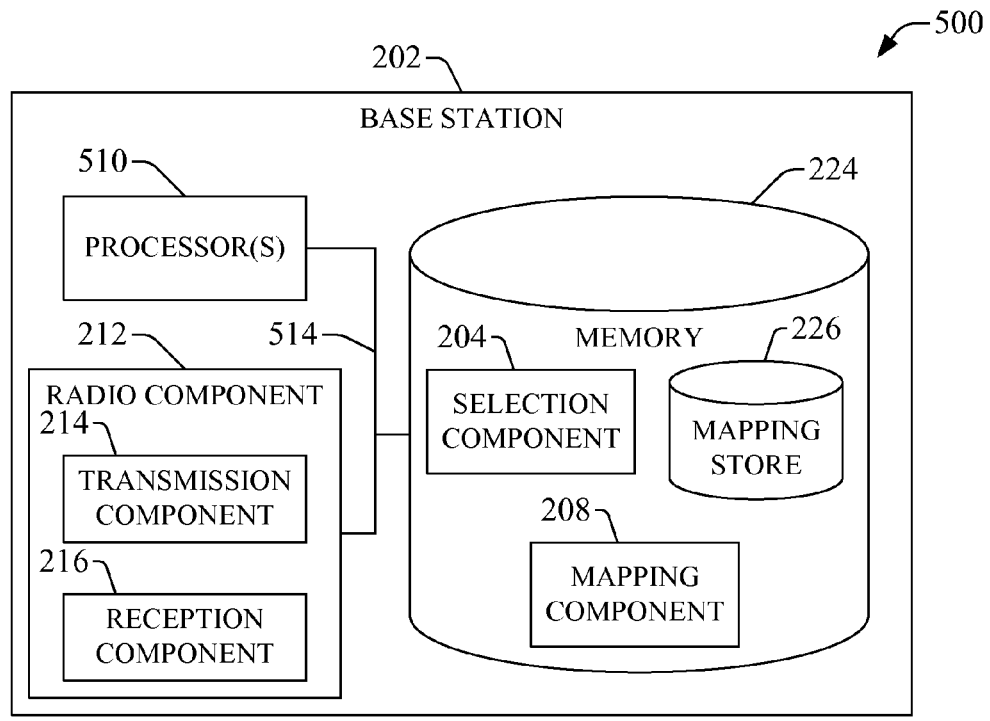
FIG. 5 presents an example embodiment of a base station that supplies positioning reference signals in a wireless communication system in accordance with aspects described herein.

FIG. 5 presents an example embodiment 500 of a base station that supplies PRS in a wireless communication system in accordance with aspects described herein. In example system 400, selection component 204 and mapping component 208 are each embodied in one or more sets of computer-executable code instructions stored in memory 224. Processor(s) 510 can execute at least a first set of code instructions that implements the functionality of selection component 204 in accordance with aspects described hereinabove. In addition, processor(s) 510 can execute at least a second set of code instructions that implements the functionality of mapping component 208 in accordance with the various aspects described supra. Thus, processor(s) 510 is configured to provide the functionality of selection component 204 and mapping component 208 through execution of at least the first set of code instructions and at least the second set of code instructions. In addition, through execution of a disparate set of computer-executable code instructions retained in memory 224, processor(s) 510 is configured to operate at least in part the radio component 212, and one or more components therein, in accordance with aspects described supra. For example, processor(s) 510 is configured to transmit a PRS sequence according to a time-frequency pattern as described supra.

Processor(s) 510 is functionally coupled to radio component 212 and memory 224 via bus 514, which can be embodied in one or more of a memory bus, an address bus, a message bus, or the like. Data and signaling, indications or directives, code instructions and the like are exchanged amongst processor(s) 510, memory 224, and radio component 212 through bus 514. Memory 224 can include computer-executable code instructions related to various aspects described herein, and a mapping store 226, in accordance with aspects described herein.

Figure 6:
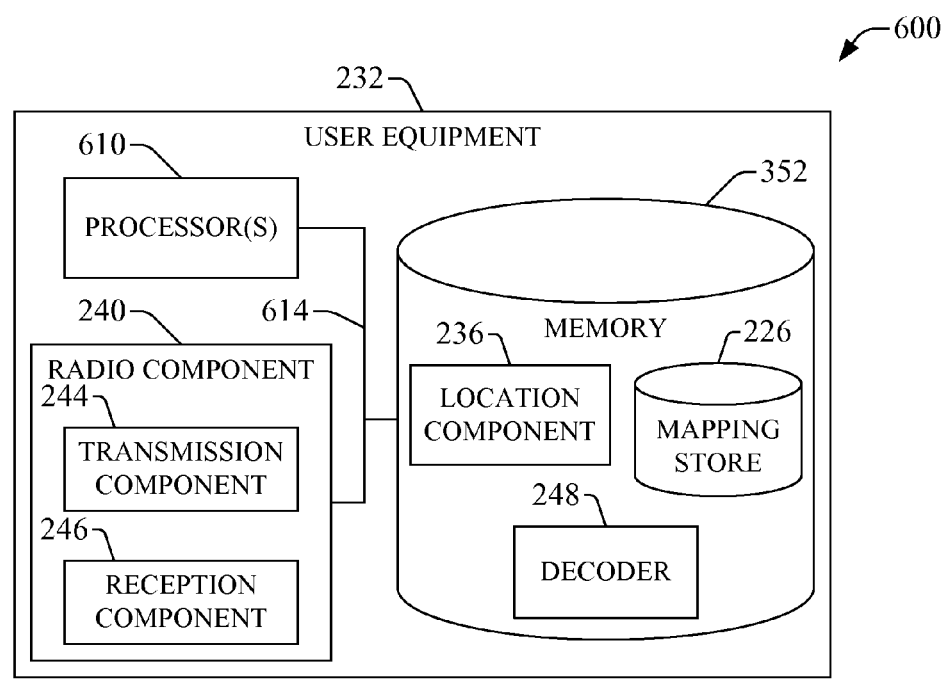
FIG. 6 presents an example embodiment of user equipment that utilizes a PRS in a wireless communication system in accordance with aspects described herein.

FIG. 6 presents an example embodiment 600 of a user equipment that utilizes PRS supplied by a base station in a wireless communication system in accordance with aspects described herein. In the subject example system, location component 236 and decoder 248 are each embodied in one or more sets of code instructions stored in memory 352. Processor(s) 610 can execute at least a first set of code instructions that implements the functionality of location component 236 in accordance with aspects described hereinabove. In addition, processor(s) 610 can execute at least a second set of code instructions that implements the functionality of decoder 248 in accordance with the various aspects described supra. Thus, processor(s) 610 is configured to provide the functionality of location component 236 and decoder 248 through execution of at least the first set of code instructions and at least the second set of code instructions. In alternative or additional embodiments, decoder 248 can be distributed amongst radio component 240 and memory 352; the portion of decoder 248 can be retained in memory 352 as a group of computer-executable code instructions. In addition, through execution of a disparate set of code instructions retained in memory 352, processor(s) 610 is configured to operate at least in part the radio component 240, and one or more components therein, in accordance with aspects described supra.

Processor(s) 510 is functionally coupled to radio component 240 and memory 352 via bus 614, which can be embodied in one or more of a memory bus, an address bus, a message bus, or the like. Data and signaling, indications or directives, code instructions and the like are exchanged amongst processor(s) 610, memory 352, and radio component 240 through bus 614.

Referring to FIGS. 7-10, example methods according to aspects disclosed herein and relating to generating and delivering PRS sequences in a wireless communication environment are illustrated. While, for purposes of simplicity of explanation, the example methods are presented and described as a series of acts, it is to be understood and appreciated that the example methods are not limited by the order of acts, as some acts can, in accordance with one or more embodiments, occur in different orders or concurrently with other acts from those shown and described herein. For example, it can be understood and appreciated that an example method, or a set of one or more example methods can alternatively be represented as a series of interrelated states or events, such as in a state diagram or in a call flow. Moreover, in one or more embodiments, not all illustrated acts can be required to implement an example method or an example methodology resulting from a combination of two or more example methods described herein.

Figure 7:
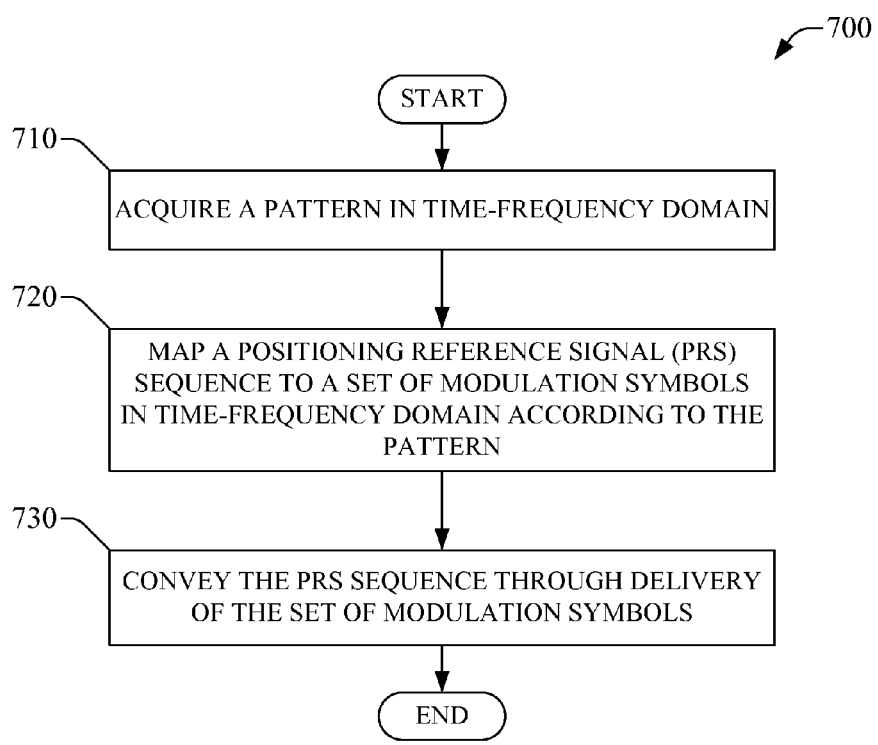
FIG. 7 presents a flowchart of an example method for supplying a position reference signal (PRS) in a wireless communication system according to aspects described herein.

FIG. 7 presents a flowchart of an example method 700 for supplying position reference signal (PRS) in a wireless communication system according to aspects described herein. The subject example method can be exploited in various types of wireless communication system, such as cellular telecommunication networks wireless network environments that comprise a plurality of private or semi-private access points to provide wireless service. One or more base stations (e.g., a cellular base station, a Wi-Fi access point, a femtocell access point, or the like) in a wireless communication system can implement (e.g., execute or perform) the subject example method. At act 710, a pattern in time-frequency domain is selected. As described supra, the pattern can be represented by a mapping between a sequence of reference symbols, e.g., a PRS sequence, and one or more modulation symbols in a block of time-frequency resources. Moreover, the pattern is specific to a coverage cell in the wireless communication system, or the base station that serves the coverage cell. For a cellular wireless communication system, such as a 3GPP LTE wireless network, or a 3GPP UMTS wireless network, the pattern can be specific to a radio sub-frame structure. In an aspect, as described supra, selecting the pattern in time-frequency domain includes extracting from a memory at least one of a first pattern for a radio sub-frame structure with a normal cyclic prefix (CP), a second pattern for a radio sub-frame structure with an extended CP, or a third pattern for a multicast/broadcast single frequency network (MBSFN) sub-frame. The first pattern, the second pattern, and the third pattern can be specific to a coverage cell in a cellular telecommunication system.

At act 720, a PRS sequence is mapped to a set of modulation symbols (e.g., OFDM symbols) in time-frequency domain according to the pattern. In an aspect, the pattern, or the mapping, that is exploited to conduct the mapping assigns a modulation symbol to at least one frequency tone in the block of time-frequency resources (e.g., one or more physical resource blocks in a 3GPP LTE network). Mapping the PRS sequence to a set of modulation symbols can include evaluating one or more relationships that define the mapping, as described supra. The computing can be enabled by executing computer-executable code instructions that cause at least one processor, or computer, to evaluate the one or more relationships. At act 730, the PRS sequence is conveyed through delivery of the set of modulation symbols. In one or more embodiments, the base station that enacts the subject example method 700 can broadcast the set of modulation symbols. In alternative embodiments, the base station can multicast or unicast the set of modulation symbols. Delivering the set of modulation symbols can include configuring a delivery mode (e.g., broadcast, multicast, or unicast) of the PRS sequence.

Figure 8:
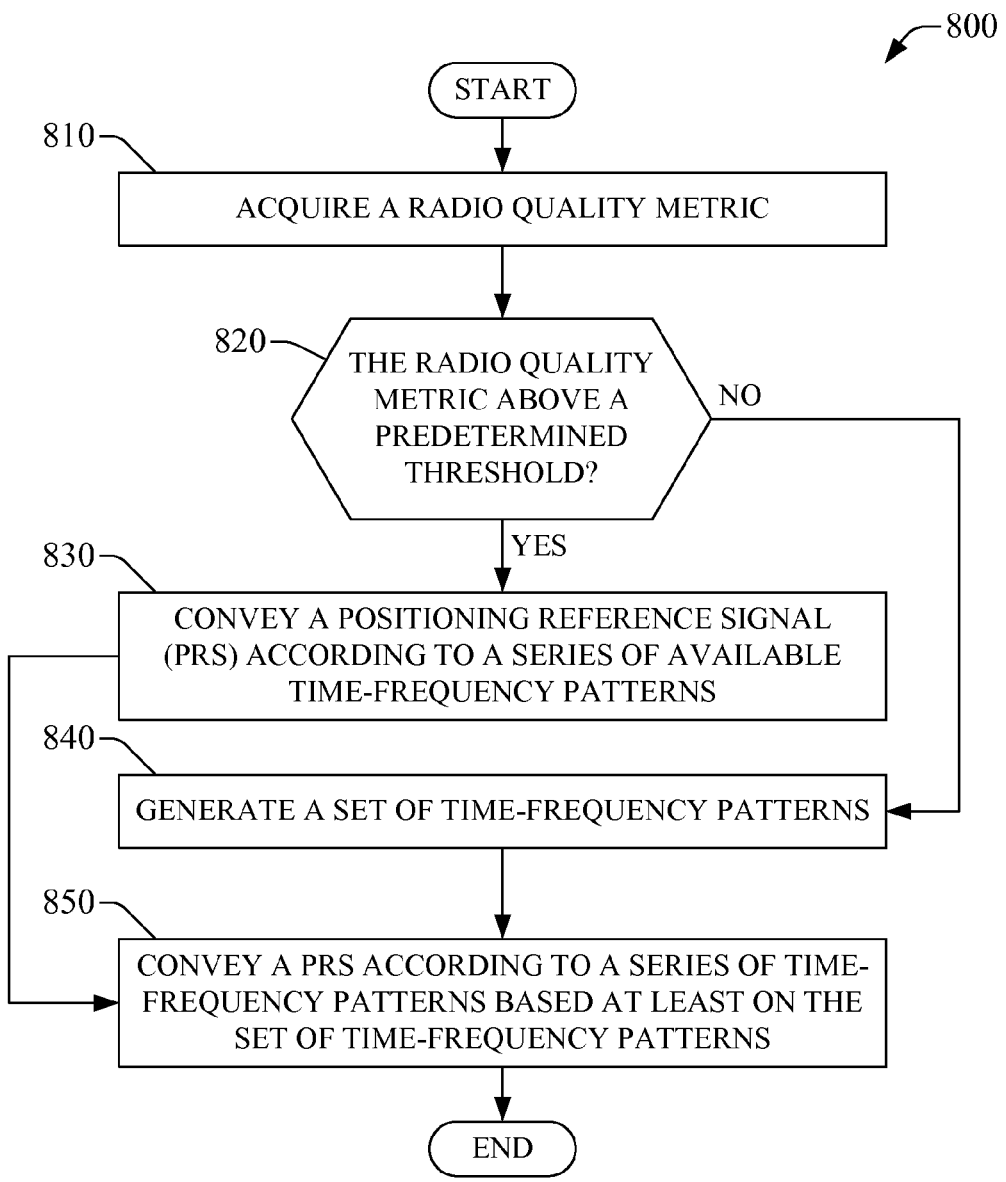
FIG. 8 presents a flowchart of an example method for selecting a pattern in time frequency-domain for generating a set of reference symbols to convey a PRS in a wireless communication system according to aspects described herein.

FIG. 8 presents a flowchart of an example method 800 for selecting a pattern in time frequency-domain for generating a set of reference symbols to convey a PRS in a wireless communication system according to aspects described herein. In an example scenario, the subject example method can embody at least a part of act 710. At act 810, a radio-interface quality metric is acquired (determined, retrieved, received, etc.). The radio-interface interference quality metric can be a measure of inter-cell interference, interference-over-thermal (IoT), signal-to-interference (S/I) ratio, signal-to-noise-and-interference ratio (SNIR), or other suitable assessment of interference related to a base station in a wireless system. At act 820, it is determined if the radio-interface quality metric is above a predetermined threshold. In a scenario in which the radio-interface quality metric is above the predetermined threshold, at act 830, a positioning reference signal is conveyed according to a series of available time-frequency patterns; the series includes a group of distinct time-frequency patterns (see, e.g., FIG. 3). Conversely, in a scenario in which the radio-interface quality metric is below the predetermined threshold, at act 840, a set of time-frequency patterns is generated. A component (e.g., generation component 408) within the base station that enacts the subject example method can generate the set of time-frequency patterns. The predetermined threshold can be statically configured or dynamically configured; the base station that performs the subject example method 800 can configure the predetermined threshold, even though in certain embodiments a network node (e.g., mobility management entity (MME)) can configure the predetermined threshold. At act 850, a PRS is conveyed according to a series of time-frequency patterns based at least on the set of time-frequency patterns.

Figure 9:
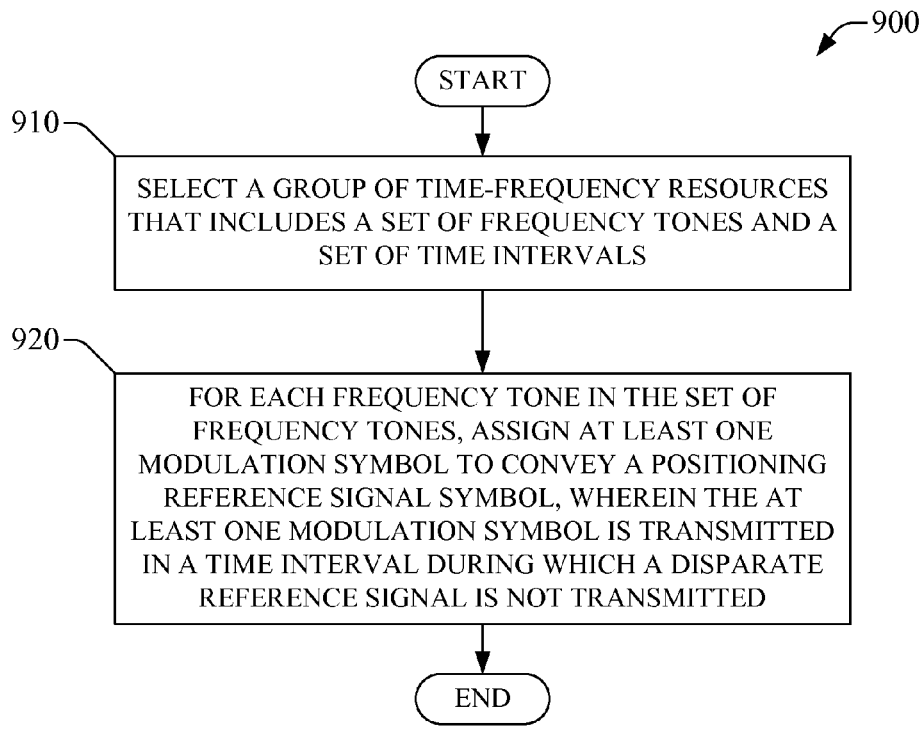
FIG. 9 is a flowchart of an example method for generating a time-frequency pattern for associating one or more modulation symbols with a PRS sequence in a wireless communication system according to aspects described herein.

FIG. 9 is a flowchart of an example method 900 for generating a time-frequency pattern for associating one or more modulation symbols with a PRS sequence in a wireless communication system according to aspects described herein. In an illustrative scenario, the subject example method can embody at least a part of act 840. The time-frequency pattern generated according to the subject example method mitigates secondary correlation peaks during detection of position reference signals. In an embodiment, a base station or a component therein (e.g., generation component 408) can generate the time-frequency pattern according to the subject example method. However, in alternative or additional embodiment(s), a network node (e.g., MME in 3GPP LTE network) can generate the time-frequency pattern according to the subject example method. At act 910, a group of time-frequency resources is selected. The group of time-frequency resources includes a set of frequency tones and a set of time intervals, wherein the set of frequency tones spans a portion of the electromagnetic spectrum. In an aspect, in a 3GPP LTE network or a 3GPP UMTS network the group of time-frequency resources span $N_{RB}^{PRS}$ resource blocks. At act 920, for each frequency tone, or subcarrier, in the set of frequency tones, at least one modulation symbol is assigned to convey a PRS symbol, wherein the at least one modulation symbol is transmitted in a time interval that is part of the set of time intervals and during which a disparate reference signal (or pilot signal), such as cell specific reference signal (CRS), is not transmitted.

Figure 10:
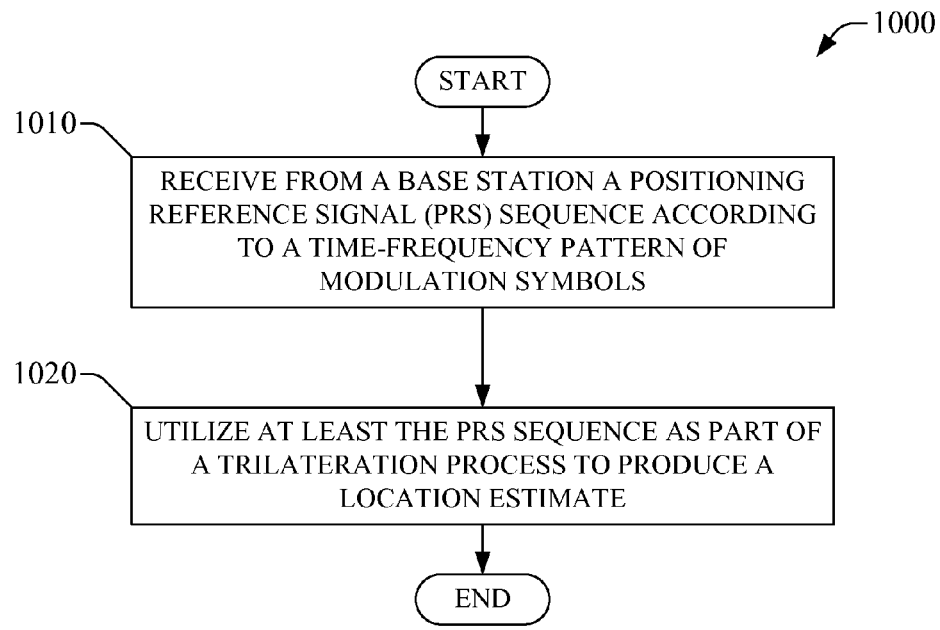
FIG. 10 presents a flowchart of an example method for exploiting PRS supplied according to aspects described herein. A mobile device, or UE, can perform the subject example method.

FIG. 10 presents a flowchart of an example method 1000 for exploiting PRS supplied according to aspects described herein. A mobile device, or UE, can perform the subject example method. At act 1010, a positioning reference signal sequence is received from a base station according at least to a time-frequency pattern of modulation symbols (e.g., OFDM symbols). The base station can be a serving base station or a non-serving base station. As described supra, the time-frequency pattern of modulation symbols is specific to the base station and to a block of time-frequency resources, e.g., a set of frequency subcarriers or tones and a set of time intervals. As an example, in cellular telecommunication networks such as 3GPP LTE, the block of time-frequency resources can be one or more resource blocks in DL. Receiving the PRS sequence can include receiving a group of disparate time-frequency patterns of modulation symbols for a group of respective disparate radio sub-frames. The group of disparate time-frequency patterns forms a sequence of patterns and the cardinality, or size, of such group establishes a periodicity for receiving positioning reference signal.

In addition, the time-frequency pattern of modulation symbols can be specific to the radio sub-frame structure that can carry PRS reference symbols over the radio interface. In an aspect of the subject disclosure, for 3GPP LTE networks or 3GPP UMTS networks, receiving the PRS sequence according at least to the time-frequency pattern of modulation symbols can be accomplished differently for disparate radio sub-frame time structure. In a scenario, the receiving act 1010 can include decoding a first pattern of modulation symbols for the PRS sequence for a normal radio sub-frame structure with a normal cyclic prefix (CP) interval. In another scenario, the receiving act 1010 can include decoding a second pattern of modulation symbols for a normal radio sub-frame structure with an extended CP interval. In yet another scenario, the receiving act can include decoding a third pattern of modulation symbols for a multicast/broadcast over a single frequency network (MBSFN) sub-frame. At act 1020, at least the PRS sequence is utilized as part of a process to produce a location estimate; in an aspect, the location estimate approximates the location of the mobile device that enacts the subject example method.

It will be appreciated that, in accordance with one or more aspects described herein, inferences can be made pertaining to supplying a PRS sequence in accordance with aspects described herein. As an example, an inference can be made as to the time-frequency structure of a pattern that assigns at least one complex-value modulation symbol for each frequency sub-carrier in block of time-frequency resources in which the pattern is defined, wherein the at least one modulation symbol carries PRS. The inference of such pattern can be directed to reducing spectral overlap with disparate time-frequency pattern(s) associated with disparate coverage cell(s). As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
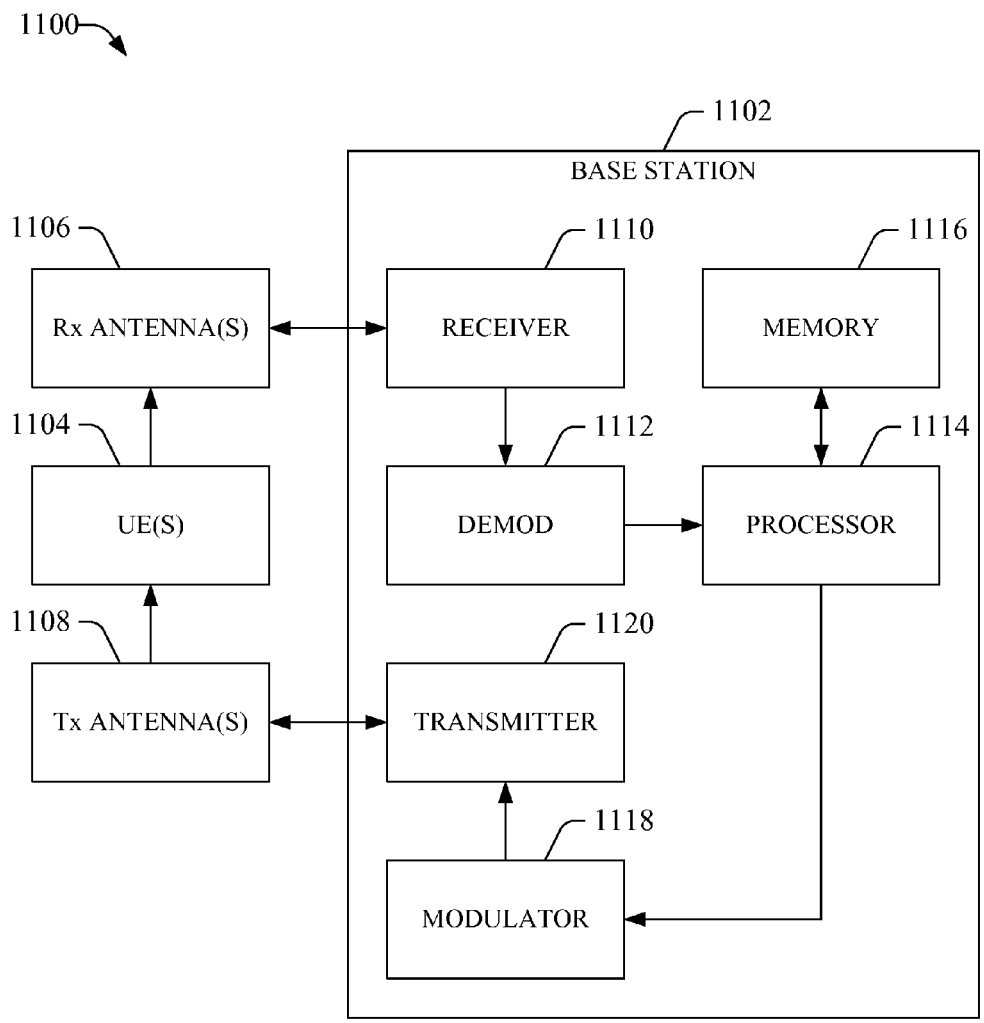
FIGS. 11-12 illustrate example systems that can be utilized to implement various aspects of the functionality described herein.

FIG. 11 illustrates an example system 1100 that can be utilized to implement various aspects of the functionality described herein. System 1100 can include a base station 1102 (e.g., base station 202). Base station 1102 can receive signal(s) from one or more UEs 1104 via one or more receive (Rx) antennas 1106 and transmit to the one or more UEs 1104 via one or more transmit (Tx) antennas 1108. Further, base station 1102 can include a receiver 1110 that receives information from receive antenna(s) 1106. According to an example, receiver 1110 can be operatively associated with a demodulator (demod) 1112 that demodulates received information. Demodulated symbols can be analyzed by a processor 1114. Processor 1114 can be coupled to memory 1116, which can store, or retain, data to be transmitted to or received from UE(s) 1104 and/or any other suitable protocols, algorithms, information, etc. related to performing the various actions and functions set forth herein. For example, base station 1102 can employ processor 1114 to perform example method 700, example method 800, example method 900, or other similar and suitable example methods, for supplying positioning reference signal according to aspects described herein. Base station 1102 can further include a modulator 1118 that can multiplex a signal for transmission by a transmitter 1120 through antenna(s) 1108.

Processor 1114 can be a processor dedicated to analyzing information received by receiver 1110, dedicated to generating information for transmission by transmitter 1120, or dedicated to controlling one or more components of base station 1102. According to another example, processor 1114 can analyze information received by receiver 1110, generate information for transmission by transmitter 1120, and control one or more components of base station 1102. The one or more components of base station 1102 can include, for example, selection component 204, mapping component 208, transmission component 214, reception component 216, or combinations of such components. Moreover, although not shown, it is contemplated that the one or more components of base station 1102 can be part of processor 1114 or a plurality of processors within base station 1102.

Figure 12:
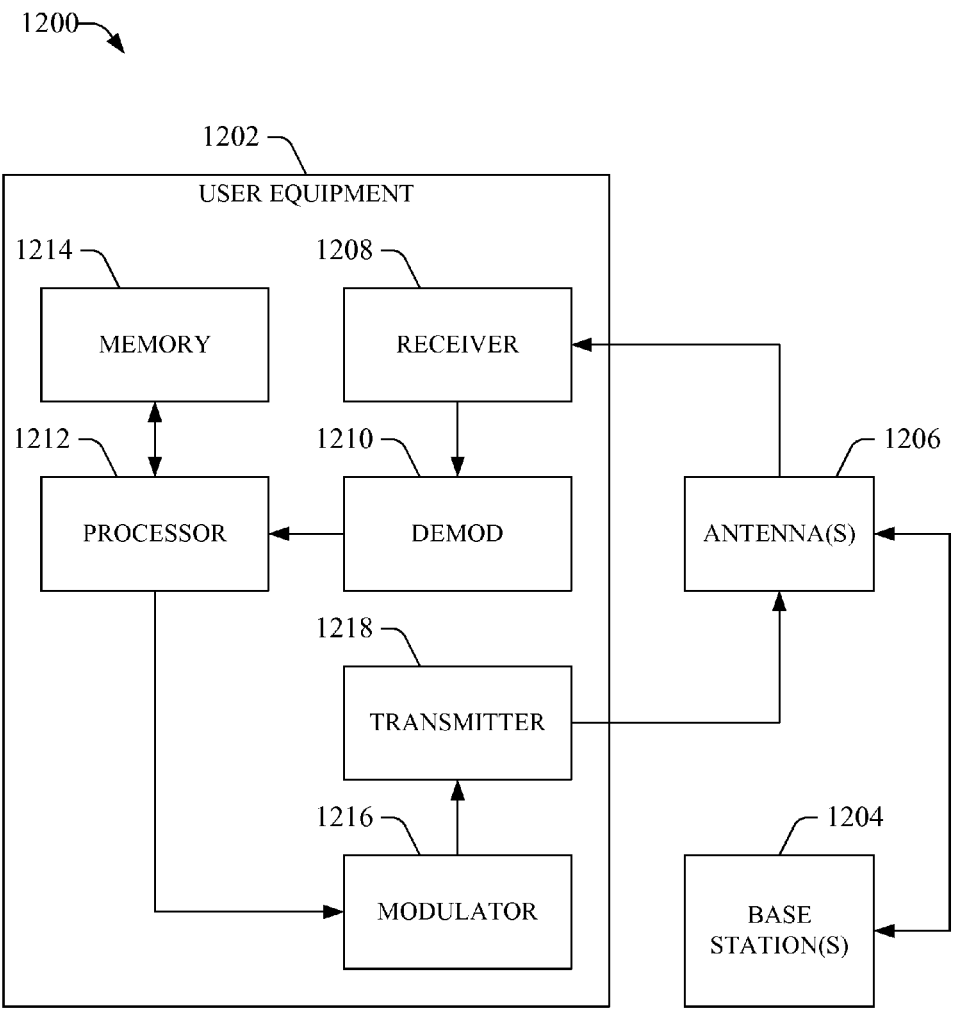

FIG. 12 illustrates an example system 1200 that can be utilized to implement various aspects of the functionality described herein. System 1200 can include a UE 1202 (e.g., UE 232). UE 1202 can receive signal(s) from one or more base stations 1204 and/or transmit to one or more base stations 1204 via one or more antennas 1206. Further, UE 1202 can include a receiver 1208 that receives information from antenna(s) 1206. According to an example, receiver 1208 can be operatively associated with a demodulator (demod) 1210 that demodulates received information. Demodulated symbols can be analyzed by a processor 1212. Processor 1212 can be coupled to memory 1214, which can store data to be transmitted to or received from base station(s) 1204 and/or any other suitable protocols, algorithms, information, etc. related to performing the various actions and functions set forth herein. For example, UE 1202 can employ processor 1212 to perform example method 1000 and/or other similar and suitable methods for consuming PRS sequence(s) supplied by a base station according to aspects disclosed herein. UE 1202 can further include a modulator 1216 that can multiplex a signal for transmission by a transmitter 1218 through antenna(s) 1206.

Processor 1212 can be a processor dedicated to analyzing information received by receiver 1208, dedicated to generating information for transmission by transmitter 1218, or dedicated to controlling one or more components of UE 1202. According to another example, processor 1212 can analyze information received by receiver 1208, generate information for transmission by transmitter 1218, and control one or more components of UE 1202. The one or more components of UE 1202 can include, for example, location component 236, decoder component 248, transmission component 244, reception component 246, or various combinations of such components. Moreover, although not shown, it is contemplated that the one or more components of UE 1202 can be part of processor 1212 or a plurality of processors (not shown).

Figure 13:
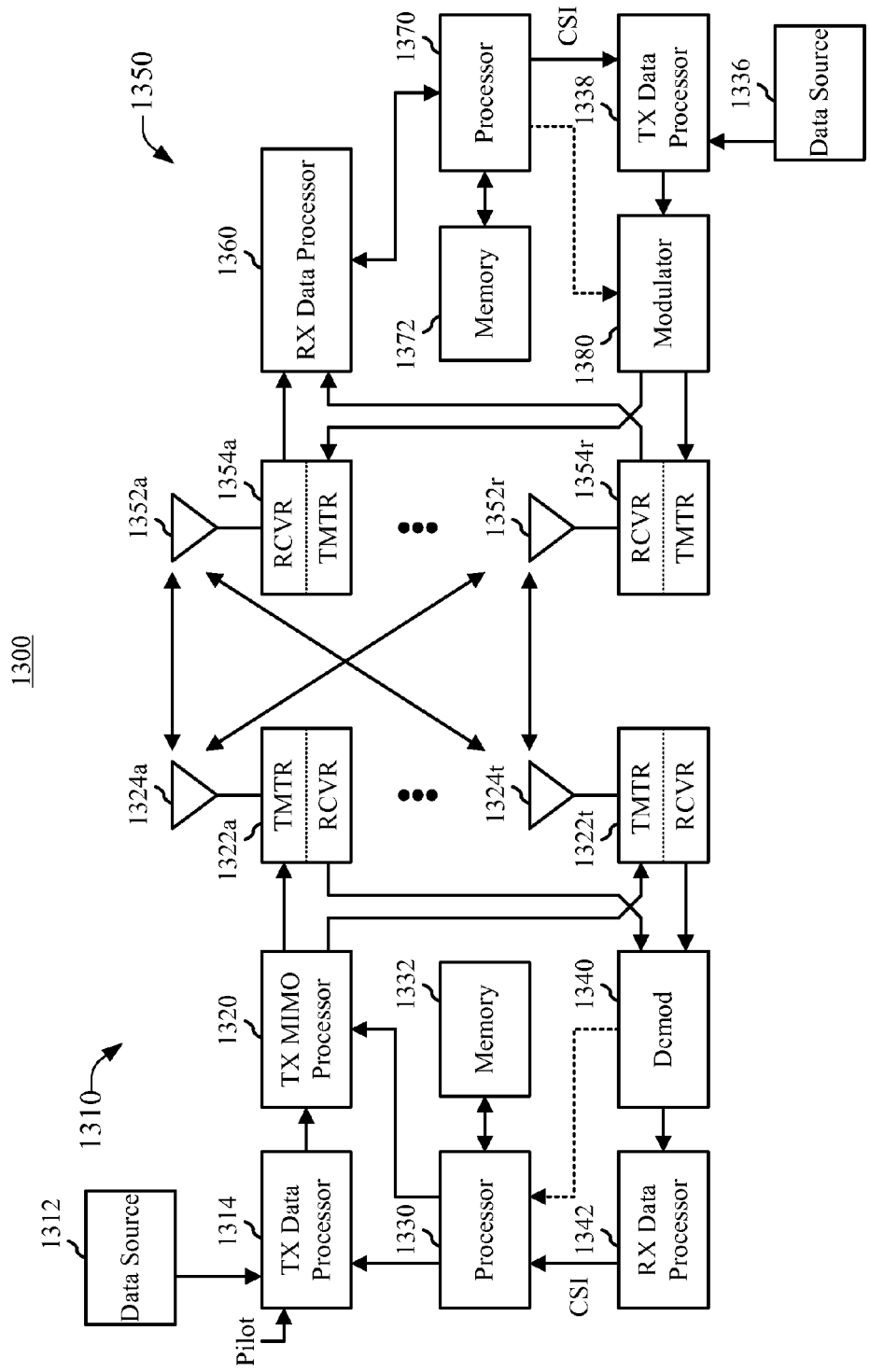
FIGS. 13-14 illustrate example wireless communication systems that can be employed in conjunction with the various systems and methods described herein.

FIG. 13 presents an example wireless communication system 1300. Example wireless communication system 1300 depicts one base station 1310 and one UE 1350 for sake of brevity. However, it is to be appreciated that example wireless communication system 1300 can include more than one base station and/or more than one UE, wherein additional base stations and/or UEs can be substantially similar or different from example base station 1310 and UE 1350 described below. In addition, it is to be appreciated that base station 1310 and/or UE 1350 can employ the systems (e.g., FIGS. 1, 2, and 5-6) and/or methods (FIGS. 7-10) described herein to enable wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at UE 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At UE 1350, the transmitted modulated signals are received by $N_R$ antennas 1352a through 1352r and the received signal from each antenna in the group of antennas 1352a-1452r is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate an uplink message comprising a matrix index portion and a rank value portion.

The uplink message can comprise various types of information regarding the telecommunication link and/or the received data stream. The uplink message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from UE 1350 are received by antennas 1324, conditioned by receivers 1322, demodulated by a demodulator 1340, and processed by a RX data processor 1342 to extract the uplink message transmitted by UE 1350. Further, processor 1330 can process the extracted message to determine which precoding matrix to use for determining the beamforming weights.

Processors 1330 and 1370 can direct (e.g., control, coordinate, manage, etc.) operation at base station 1310 and UE 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

Figure 14:
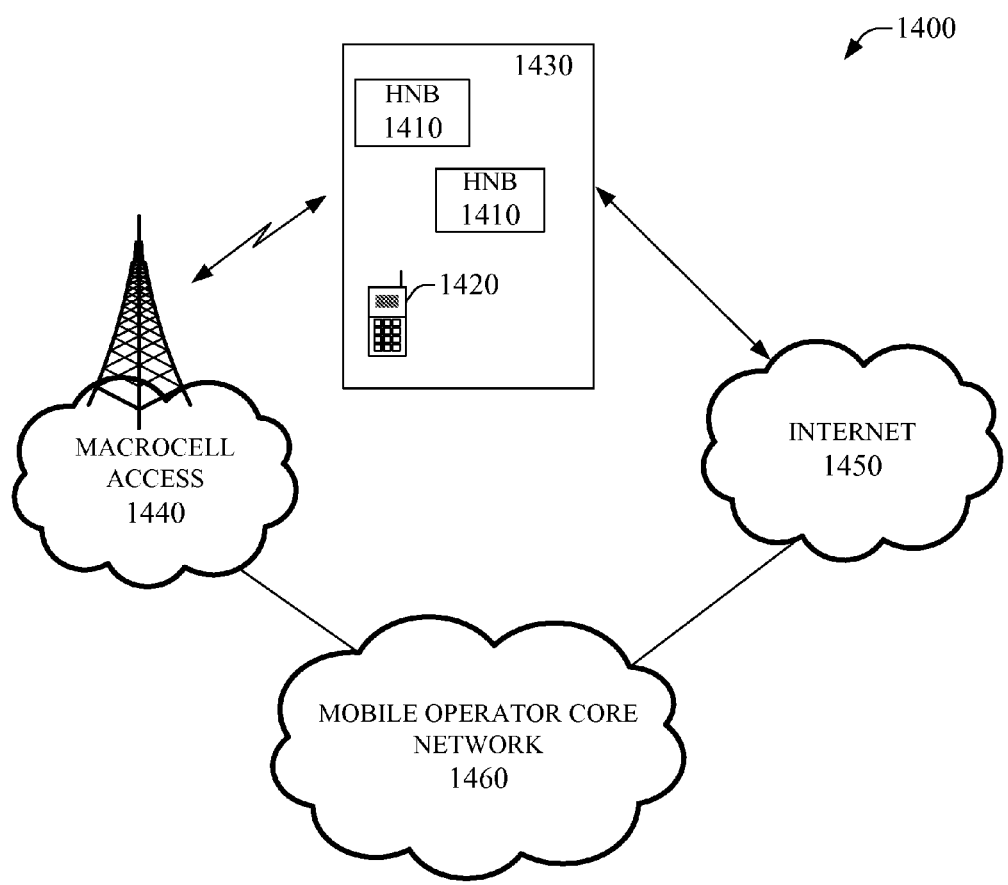

FIG. 14 illustrates an example wireless communication system 1400 to implement or exploit various aspects of the subject disclosure. As illustrated, the example wireless communication system 1400 includes multiple base stations or, in the alternative, femtocells, Home Node B units (HNBs), or Home evolved Node B units (HeNBs), such as HNBs 1410, each being installed in a corresponding small scale network environment, such as in one or more user residences 1430, and being configured to serve associated, as well as alien, user equipment (UE) or mobile stations 1420. Mobile station 1420 can handoff from wireless service provided via macrocell access 1440 to wireless coverage afforded by, for example, one or more HNB 1410. Each HNB 1410 is further coupled to the Internet 1450 and a mobile operator core network 1460 via a DSL router (not shown) or, alternatively, a cable modem (not shown).

Figure 15:
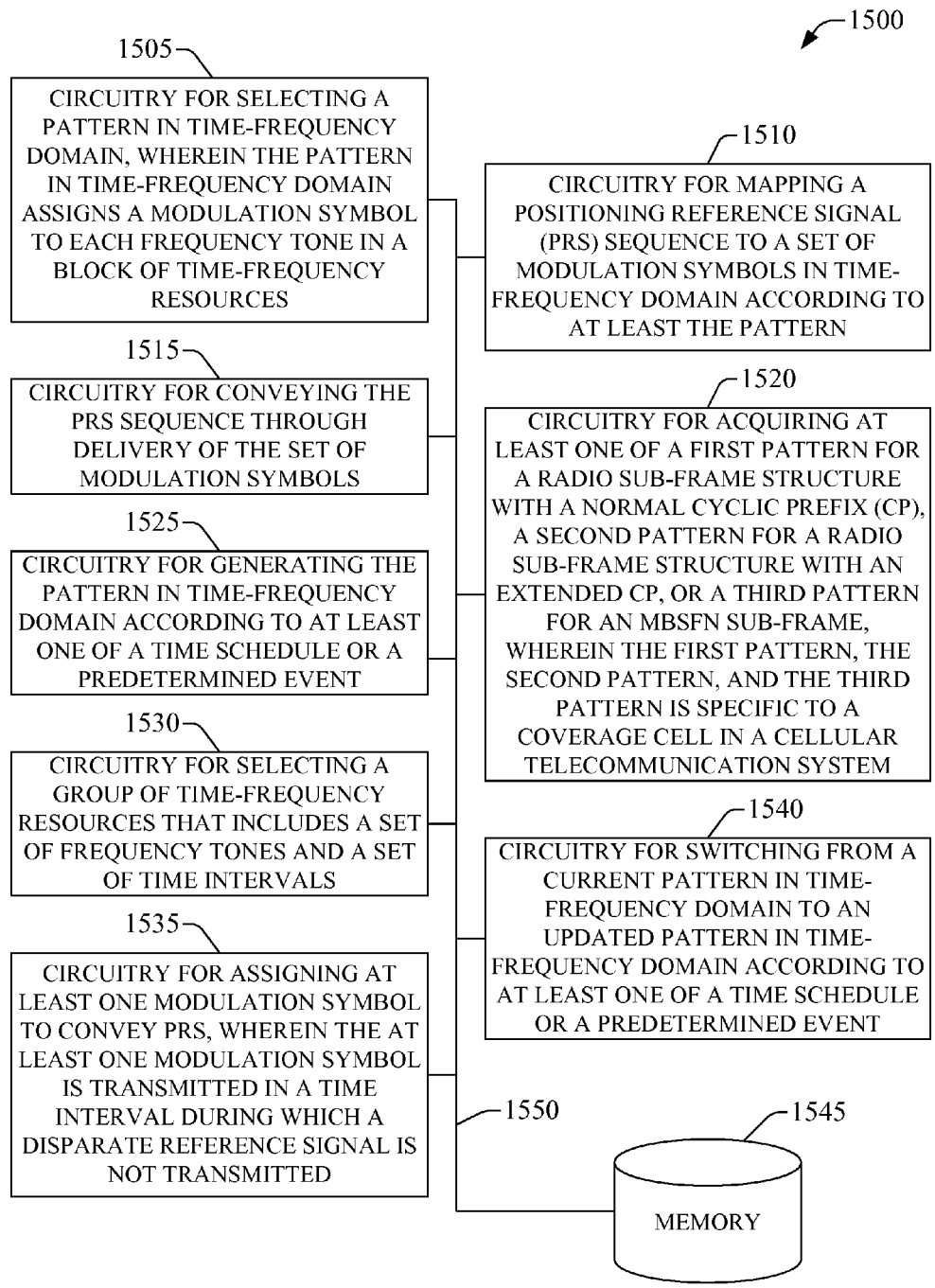
FIGS. 15-16 illustrate example systems that enable supplying and utilizing positioning reference signal in a wireless telecommunication system in accordance with aspects described herein.
Figure 16:
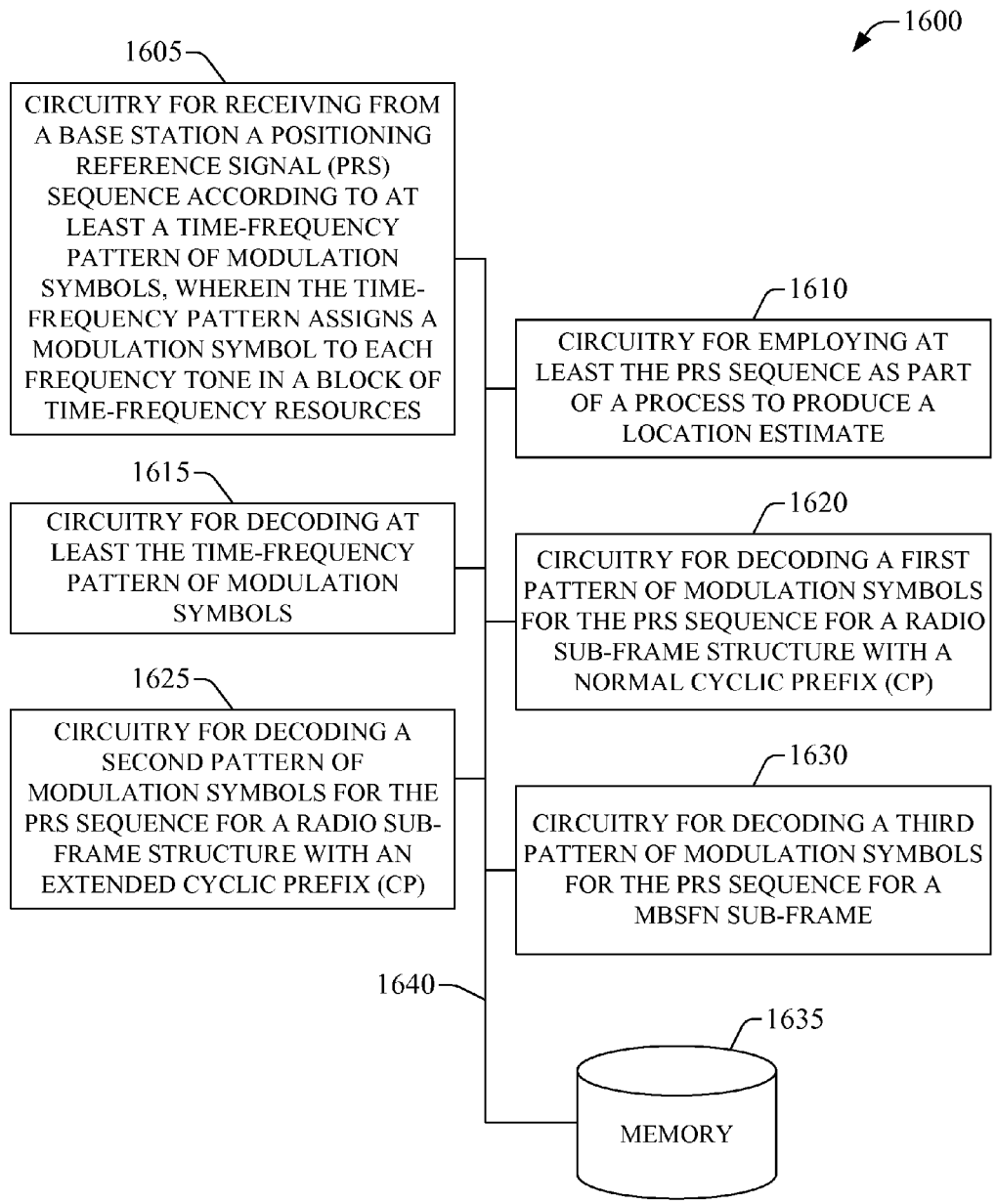

FIGS. 15-16 illustrate example systems 1500 and 1600, respectively, that enable supplying and utilizing positioning reference signal in a wireless telecommunication system in accordance with aspects described herein. Example system 1500 can reside at least in part within a base station (e.g., 202). It is to be appreciated that system 1500 is represented as including functional blocks, or electronic circuitry, which can be functional blocks that represent functions implemented by a processor, software, or combination thereof (e.g., firmware) . As illustrated, example system 1500 includes electronic circuitry (also referred to as circuitry) 1505 for selecting a pattern in time-frequency domain, wherein the pattern in time-frequency domain assigns a modulation symbol to each frequency tone in a block of time-frequency resources; circuitry 1510 for mapping a positioning reference signal (PRS) sequence to a set of modulation symbols in time-frequency domain according to at least the pattern; and circuitry 1515 for conveying the PRS sequence through delivery of the set of modulation symbols.

In addition, example system 1500 includes circuitry 1520 for acquiring at least one of a first pattern for a radio sub-frame structure with a normal cyclic prefix (CP), a second pattern for a radio sub-frame structure with an extended CP, or a third pattern for a multicast/broadcast single frequency network (MBSFN) sub-frame, wherein the first pattern, the second pattern, and the third pattern is specific to a coverage cell in a cellular telecommunication system. Moreover, example system 1500 includes circuitry 1525 for generating the pattern in time-frequency domain according to at least one of a time schedule or a predetermined event; circuitry 1530 for selecting a group of time-frequency resources that includes a set of frequency tones and a set of time intervals; and circuitry 1535 for assigning at least one modulation symbol to convey PRS, wherein the at least one modulation symbol is transmitted in a time interval during which a disparate reference signal is not transmitted. In an aspect, circuitry 1535 can be exploited for each frequency tone in the set of frequency tones or for a group in the set of frequency tones. Further yet, example system 1500 includes circuitry 1540 for switching from a current pattern in time-frequency domain to an updated pattern in time-frequency domain according to at least one of a time schedule or a predetermined event.

The example system 1500 also includes a memory 1545 that can retain one or more sets of computer-executable code instructions that, in response to execution by at least one processor (not shown), which can be part of the described circuitry, implement or enable the functionality of the circuitry that is part of example system 1500 in accordance with aspects or features described herein in connection with coding PRS through a time-frequency pattern that maps a PRS reference symbol to a modulation symbol in a block of time-frequency resources, as described supra. In certain embodiments, the at least one processor (not shown) can be distributed amongst the circuitry that is part of example system

1500. In alternative or additional embodiments, the at least one processor can be centralized in a portion, e.g., within specific circuitry, within example system 1500. The one or more sets of computer-executable code instructions retained in memory 1545 enable executing functions associated with circuitry. While shown as being external to memory 1545, it is to be understood that one or more of circuitry 1505, 1510, 1515, 1520, 1525, 1530, 1535, or 1540 can reside within the memory 1545. Memory 1545 also can retain one or more parameters that define one or more mappings that can represent various time-frequency patterns employed to supplying.

Interface 1550 enables exchange of data (e.g., code instructions, parameters . . . ) amongst the various circuitry of example system 1500. To at least such end, the interface 1550 can include various architectures such as memory bus(es), address bus(es), message bus(es), wired or wireless links, or the like.

Various embodiments of example system 1500 can be attained through one or more structural variations thereof, where one or more of circuitry 1505, 1510, 1515, 1520, 1525, 1530, 1535 or 1540 are combined into different circuitry. As an example, circuitry 1505 can be combined with one or more of circuitry 1520, circuitry 1525, or circuitry 1535. As another example, circuitry 1525 can be combined with circuitry 1530 and circuitry 1535.

Example system 1600 can reside at least in part within a user equipment (e.g., UE 232). It is to be appreciated that system 1600 is represented as including functional blocks, or electronic circuitry, which can be functional blocks that represent functions implemented by a processor, software, or combination thereof (e.g., firmware). As illustrated, example system 1600 includes electronic circuitry (also referred to as circuitry) 1605 for receiving from a base station a positioning reference signal (PRS) sequence according to at least a time-frequency pattern of modulation symbols, wherein the time-frequency pattern assigns a modulation symbol to each frequency tone in a block of time-frequency resources; and circuitry 1610 for employing at least the PRS sequence as part of a process to produce a location estimate.

In addition, example system 1600 includes circuitry 1615 for decoding at least the time-frequency pattern of modulation symbols. In one or more embodiments, circuitry 1615 can be part of circuitry 1615. Moreover, example system 1600 includes circuitry 1620 for decoding a first pattern of modulation symbols for the PRS sequence for a radio sub-frame structure with a normal cyclic prefix (CP); circuitry 1625 for decoding a second pattern of modulation symbols for the PRS sequence for a radio sub-frame structure with an extended cyclic prefix (CP); and circuitry 1630 for decoding a third pattern of modulation symbols for the PRS sequence for a multicast/broadcast over a single frequency network (MB-SFN) sub-frame. In certain embodiments, one or more of circuitry 1620, circuitry 1625, and circuitry 1630 can be combined with circuitry 1615.

The example system 1600 also includes a memory 1635 that can retain one or more sets of computer-executable code instructions that, in response to execution by at least one processor (not shown), which can be part of the described circuitry, implement or enable the functionality of the circuitry that is part of example system 1600 in accordance with aspects or features described herein in connection with consuming (e.g., receiving, decoding, and utilizing) PRS in accordance with aspects described herein. In certain embodiments, the at least one processor (not shown) can be distributed amongst the circuitry that is part of example system 1600. In alternative or additional embodiments, the at least one processor can be centralized in a portion, e.g., within specific circuitry, within example system 1600. The one or more sets of computer-executable code instructions retained in memory 1635 enable executing functions associated with circuitry. While shown as being external to memory 1635, it is to be understood that one or more of circuitry 1605, 1610, 1615, 1620, 1625, or 1630 can reside within the memory 1635. Memory 1635 also can retain one or more parameters that define one or more mappings that can represent various time-frequency patterns employed to supplying.

Interface 1640 enables exchange of data (e.g., code instructions, parameters . . . ) amongst the various circuitry of example system 1600. To at least such end, the interface 1640 can include various architectures such as memory bus(es), address bus(es), message bus(es), wired or wireless links, or the like.

Various embodiments of example system 1600 can be attained through one or more structural variations thereof, where one or more of circuitry 1605, 1610, 1615, 1620, 1625, or 1630 are combined into different circuitry.

It is understood that the specific order or hierarchy of steps, or acts, in the disclosed methods or processes is an example of suitable approaches. Based upon design preferences, it is understood that the specific order or hierarchy of steps, or acts, in the processes may be rearranged while remaining within the scope of the present disclosure. The accompanying method claims present elements of the various steps, or acts, in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable storage medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored, or retained, in memory units and executed by processors. The memory unit can be implemented within the processor or external to the processor, in which case it can be communicatively coupled to the processor via various means as is known in the art.

The steps or acts of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    selecting a pattern in time-frequency domain, wherein the pattern in time-frequency domain assigns a modulation symbol to each frequency tone in a block of time-frequency resources, wherein the selecting includes acquiring from a memory at least one of a first pattern for a radio sub-frame structure with a normal cyclic prefix (CP), a second pattern for a radio sub-frame structure with an extended CP, or a third pattern for a multicast/broadcast single frequency network (MBSFN) sub-frame, wherein the first pattern, the second pattern, and the third pattern are specific to a coverage cell in a cellular telecommunication system;
    mapping a positioning reference signal (PRS) sequence to a set of modulation symbols in time-frequency domain according to at least the pattern; and
    conveying the PRS sequence through delivery of the set of modulation symbols.

2. The method of claim 1, wherein the selecting includes:
    generating the pattern in time frequency domain according to at least one of a time schedule or a predetermined event.

3. The method of claim 2, wherein the generating includes:
    selecting a group of time-frequency resources that includes a set of frequency tones and a set of time intervals; and
    for each frequency tone in the set of frequency tones, assigning at least one modulation symbol to convey PRS, wherein the at least one modulation symbol is transmitted in a time interval during which a disparate reference signal is not transmitted.

4. The method of claim 1, wherein the selecting includes:
    switching from a current pattern in time-frequency domain to an updated pattern in time-frequency domain according to at least one of a time schedule or a predetermined event.

5. An apparatus, comprising:
    at least a memory that retains instructions related to selecting a pattern in time-frequency domain, wherein the pattern in time-frequency domain assigns a modulation symbol to each frequency tone in a block of time-frequency resources, wherein the instructions related to the selecting include instructions related to acquiring at least one of a first pattern for a radio sub-frame structure with a normal cyclic prefix (CP), a second pattern for a radio sub-frame structure with an extended CP, or a third pattern for a multicast/broadcast single frequency network (MBSFN) sub-frame, wherein the first pattern, the second pattern, and the third pattern are specific to a coverage cell in a cellular telecommunication system, mapping a positioning reference signal (PRS) sequence to a set of modulation symbols in time-frequency domain according to at least the pattern, and conveying the PRS sequence through delivery of the set of modulation symbols; and
    at least a processor functionally coupled to at least the memory and configured to execute the instructions retained in at least the memory.

6. The apparatus of claim 5, wherein the first pattern includes at least a first relationship that establishes a frequency-domain index, wherein the first relationship includes addition of a first static offset and a first time-dependent offset, the first time-dependent offset is based on a first sequence of numbers defined by a time-domain index and parity of a time slot, and a first constant determined in part by an index of the coverage cell in the cellular telecommunication system.

7. The apparatus of claim 6, wherein:
    the first static offset equals 6m where m is an integer index that spans the interval from 0 to $2N_{RB}^{DL}-1$ in increments of unity, where $N_{RB}^{DL}$ is number of resource blocks (RBs) in downlink; and
    the first time-dependent offset equals $(v+v_{shift}) \bmod 6$ where v is an integer in the first sequence of numbers and $v_{shift}$ is the first constant and satisfies one of $$v_{shift} = \left(N_{ID}^{cell} + \sum_{i=0}^{2} 2^i c(i+3SFN)\right) \bmod 6$$

or $v_{shift}=(N_{ID}^{cell}) \bmod 6$, $N_{ID}^{cell}$ is the index of the coverage cell, SFN is the system frame number and c(•) is a pseudo-random sequence, wherein the integer in the first sequence of number is defined by $$v = \begin{cases} 4, 5, 0 & \text{for } l = 3, 5, 6 \quad \text{if } n_S \bmod 2 = 0 \\ 1, 2, 3, 4, 5 & \text{for } l = 1, 2, 3, 5, 6 \quad \text{if } n_S \bmod 2 = 1 \end{cases}$$

where l is the time-domain index and $n_s$ is a slot number.

8. The apparatus of claim 5, wherein the second pattern includes at least a second relationship that establishes a frequency-domain index, wherein the second relationship includes addition of a second static offset and a second time-dependent offset, the second time-dependent offset is based on a second sequence of numbers defined by a time-domain index and parity of a time slot, and a second constant determined in part by an index of the coverage cell in the cellular telecommunication system.

9. The apparatus of claim 8, wherein:
the second static offset equals 6m where m is an integer index that spans the interval from 0 to $2N_{RB}^{DL}-1$ in increments of unity, where $N_{RB}^{DL}$ is number of resource blocks (RBs) in downlink; and
the second time-dependent offset equals $(v+v_{shift})\bmod 6$ where v is an integer in the second sequence of numbers and $v_{shift}$ is the second constant and satisfies one of $$v_{shift} = \left(N_{ID}^{cell} + \sum_{i=0}^{2} 2^i c(i+3SFN)\right) \bmod 6$$

or $v_{shift}=(N_{ID}^{cell})\bmod 6$, $N_{ID}^{cell}$ is the index of the coverage cell, SFN is the system frame number and c(•) is a pseudo-random sequence, wherein the integer in the second sequence of numbers is defined by $$v = \begin{cases} 0, 1 & \text{for } l = 4, 5 \quad \text{if } n_S \bmod 2 = 0 \\ 2, 3, 4, 5 & \text{for } l = 1, 2, 4, 5 \quad \text{if } n_S \bmod 2 = 1 \end{cases}$$

where l is the time-domain index and $n_s$ is a slot number.

10. The apparatus of claim 5, wherein the third pattern includes at least a third relationship that establishes a frequency-domain index, wherein the third relationship includes addition of a third static offset and a third time-dependent offset, the third time-dependent offset is based on a third sequence of numbers defined by a time-domain index and parity of a time slot, and a third constant determined in part by an index of the coverage cell in the cellular telecommunication system.

11. The apparatus of claim 10, wherein:
the third static offset equals 6m where m is an integer index that spans the interval from 0 to $2N_{RB}^{DL}-1$ in increments of unity, where $N_{RB}^{DL}$ is number of resource blocks (RBs) in downlink; and
the third time-dependent offset equals $(v+v_{shift})\bmod 6$ where v is an integer in the third sequence of numbers and $v_{shift}$ is the third constant and satisfies one of $$v_{shift} = \left(N_{ID}^{cell} + \sum_{i=0}^{2} 2^i c(i+3SFN)\right) \bmod 6$$

or $v_{shift}=(N_{ID}^{cell})\bmod 6$, where $N_{ID}^{cell}$ is the index of the coverage cell, SFN is the system frame number and c(•) is a pseudo-random sequence, wherein the integer in the third sequence of numbers is defined by $$v = \begin{cases} 5, 5, 0, 1 & \text{for } l = 2, 3, 4, 5 \quad \text{if } n_S \bmod 2 = 0 \\ 1, 2, 3, 3, 4, 5 & \text{for } l = 0, 1, 2, 3, 4, 5 \quad \text{if } n_S \bmod 2 = 1 \end{cases}$$

where l is the time-domain index and $n_s$ is a slot number.

12. The apparatus of claim 5, wherein the instructions related to the selecting include instructions related to generating the pattern in time frequency-domain according to at least one of a time schedule or a predetermined event.

13. The apparatus of claim 12, wherein the instructions related to the generating include:
instructions related to selecting a group of time-frequency resources that includes a set of frequency tones and a set of time intervals; and
for each frequency tone in the set of frequency tones, instructions related to assigning at least one modulation symbol to convey PRS, wherein the at least one modulation symbol is transmitted in a time interval during which a disparate reference signal is not transmitted.

14. The apparatus of claim 5, wherein the instructions related to the selecting include instructions related to switching from a current pattern in time-frequency domain to an updated pattern in time-frequency domain according to at least one of a time schedule or a predetermined event.

15. A wireless communication apparatus, comprising:
means for selecting a pattern in time-frequency domain, wherein the pattern in time-frequency domain assigns a modulation symbol to each frequency tone in a block of time-frequency resources, wherein the means for selecting includes means for acquiring at least one of a first pattern for a radio sub-frame structure with a normal cyclic prefix (CP), a second pattern for a radio sub-frame structure with an extended CP, or a third pattern for a multicast/broadcast single frequency network (MB-SFN) sub-frame, wherein the first pattern, the second pattern, and the third pattern are specific to a coverage cell in a cellular telecommunication system;
means for mapping a positioning reference signal (PRS) sequence to a set of modulation symbols in time-frequency domain according to at least the pattern; and
means for conveying the PRS sequence through delivery of the set of modulation symbols.

16. The wireless communication apparatus of claim 15, wherein the means for selecting includes means for generating the pattern in time-frequency domain according to at least one of a time schedule or a predetermined event.

17. The wireless communication apparatus of claim 16, wherein the means for generating includes:
means for selecting a group of time-frequency resources that includes a set of frequency tones and a set of time intervals; and
for each frequency tone in the set of frequency tones, means for assigning at least one modulation symbol to convey PRS, wherein the at least one modulation symbol is transmitted in a time interval during which a disparate reference signal is not transmitted.

18. The wireless communication apparatus of claim 15, wherein the means for selecting includes means for switching from a current pattern in time-frequency domain to an updated pattern in time-frequency domain according to at least one of a time schedule or a predetermined event.

19. A computer program product, comprising:
a non-transitory computer-readable medium, comprising:
code for causing at least one computer to select a pattern in time-frequency domain, wherein the pattern in time-frequency domain assigns a modulation symbol to each frequency tone in a block of time-frequency resources, wherein the code for causing the at least one computer to select the pattern in the time-frequency domain includes code for causing the at least one computer to acquire at least one of a first pattern for a radio sub-frame structure with a normal cyclic prefix (CP), a second pattern for a radio sub-frame structure with an extended CP, or a third pattern for a multicast/broadcast single frequency network (MBSFN) sub-frame;

code for causing the at least one computer to map a positioning reference signal (PRS) sequence to a set of modulation symbols in time-frequency domain according to at least the pattern; and code for causing the at least one computer to convey the PRS sequence through delivery of the set of modulation symbols.

20. The computer program product of claim 19, wherein the code for causing the at least one computer to select the pattern in time-frequency domain includes code for causing the at least one computer to generate the pattern in time-frequency domain according to at least one of a time schedule or a predetermined event.

21. The computer program product of claim 20, wherein the code for causing the at least one computer to generate the pattern in time-frequency domain according to at least one of a time schedule or a predetermined event includes:

code for causing the at least one computer to select a group of time-frequency resources that includes a set of frequency tones and a set of time intervals; and for each frequency tone in the set of frequency tones, code for causing the at least one computer to assign at least one modulation symbol to convey PRS, wherein the at least one modulation symbol is transmitted in a time interval during which a disparate reference signal is not transmitted.

22. The computer program product of claim 19, wherein the code for causing the at least one computer to select the pattern in time-frequency domain includes code for causing the at least one computer to switch from a current pattern in time-frequency domain to an updated pattern in time-frequency domain according to at least one of a time schedule or a predetermined event.

23. A wireless communication apparatus, comprising:
at least a processor configured to:
select a pattern in time-frequency domain, wherein the pattern in time-frequency domain assigns a modulation symbol to each frequency tone in a block of time-frequency resources, wherein selecting the pattern in the time-frequency domain includes acquiring at least one of a first pattern for a radio sub-frame structure with a normal cyclic prefix (CP), a second pattern for a radio sub-frame structure with an extended CP, or a third pattern for a multicast/broadcast single frequency network (MBSFN) sub-frame, wherein the first pattern, the second pattern, and the third pattern are specific to a coverage cell in a cellular telecommunication system;
map a positioning reference signal (PRS) sequence to a set of modulation symbols in time-frequency domain according to at least the pattern; and
transmit the PRS sequence through delivery of the set of modulation symbols.

24. A method, comprising:
receiving from a base station a positioning reference signal (PRS) sequence according to at least a time-frequency pattern of modulation symbols, wherein the time-frequency pattern assigns a modulation symbol to each frequency tone in a block of time-frequency resources, wherein the receiving includes at least one of decoding a first pattern of modulation symbols for the PRS sequence for a radio sub-frame structure with a normal cyclic prefix (CP), decoding a second pattern of modulation symbols for a radio sub-frame structure with an extended CP, decoding a third pattern of modulation symbols for a multicast/broadcast over a single frequency network (MBSFN) sub-frame, or decoding a current pattern of modulation symbols for a first radio sub-frame and decoding an updated pattern of modulation symbols for a second radio sub-frame; and utilizing at least the PRS sequence as part of a process to produce a location estimate.

25. An apparatus, comprising:
at least a memory that retains instructions related to receiving from a base station a positioning reference signal (PRS) sequence according to at least a time-frequency pattern of modulation symbols, wherein the instructions related to the receiving include at least one of instructions related to decoding a first pattern of modulation symbols for the PRS sequence for a radio sub-frame structure with a normal cyclic prefix (CP), instructions related to decoding a second pattern of modulation symbols for a radio sub-frame structure with an extended CP, instructions related to decoding a third pattern of modulation symbols for a multicast/broadcast over a single frequency network (MBSFN) sub-frame, or instructions for decoding a current pattern of modulation symbols for a first radio sub-frame and decoding an updated pattern of modulation symbols for a second radio sub-frame, and wherein the time-frequency pattern assigns a modulation symbol to each frequency tone in a block of time-frequency resources, and utilizing at least the PRS sequence as part of a process to produce a location estimate; and at least a processor functionally coupled to at least the memory and configured to execute the instructions retained in at least the memory.

26. A wireless communication apparatus, comprising:
means for receiving from a base station a positioning reference signal (PRS) sequence according to at least a time-frequency pattern of modulation symbols, wherein the time-frequency pattern assigns a modulation symbol to each frequency tone in a block of time-frequency resources, wherein the means for receiving include at least one of means for decoding a first pattern of modulation symbols for the PRS sequence for a radio sub-frame structure with a normal cyclic prefix (CP), means for decoding a second pattern of modulation symbols for a radio sub-frame structure with an extended CP, means for decoding a third pattern of modulation symbols for a multicast/broadcast over a single frequency network (MBSFN) sub-frame, or means for decoding a current pattern of modulation symbols for a first radio sub-frame and decoding an updated pattern of modulation symbols for a second radio sub-frame; and means for employing at least the PRS sequence as part of a process to produce a location estimate.

27. A computer program product, comprising:
a non-transitory computer-readable medium, comprising:
code for causing at least one computer to receive from a base station a positioning reference signal (PRS) sequence according to at least a time-frequency pattern of modulation symbols, wherein the time-frequency pattern assigns a modulation symbol to each frequency tone in a block of time-frequency resources, wherein the code for receiving includes at least one of code for decoding a first pattern of modulation symbols for the PRS sequence for a radio sub-frame structure with a normal cyclic prefix (CP), code for decoding a second pattern of modulation symbols for a radio sub-frame structure with an extended CP, code for decoding a third pattern of modulation symbols for a multicast/broadcast over a single frequency network (MBSFN) sub-frame, or code for decoding a current pattern of modulation symbols for a first radio sub-frame and decoding an updated pattern of modulation symbols for a second radio sub-frame; and code for causing the at least one computer to utilize at least the PRS sequence as part of a process to produce a location estimate.

28. A wireless communication apparatus, comprising:

at least a processor configured to:

receive from a base station a positioning reference signal (PRS) sequence according to at least a time-frequency pattern of modulation symbols, wherein the receiving includes at least one of decoding a first pattern of modulation symbols for the PRS sequence for a radio sub-frame structure with a normal cyclic prefix (CP), decoding a second pattern of modulation symbols for a radio sub-frame structure with an extended CP, decoding a third pattern of modulation symbols for a multicast/broadcast over a single frequency network (MBSFN) sub-frame, or decoding a current pattern of modulation symbols for a first radio sub-frame and decoding an updated pattern of modulation symbols for a second radio sub-frame, and wherein the time-frequency pattern of modulation symbols assigns a modulation symbol to each frequency sub-carrier in a block of time-frequency resources; and utilize at least the PRS sequence as part of a trilateration process to produce a location estimate.

* * * * *